(12) United States Patent
Jeong et al.

(10) Patent No.: US 12,045,407 B2
(45) Date of Patent: *Jul. 23, 2024

(54) DISPLAY DEVICE

(71) Applicant: Samsung Display Co., Ltd., Yongin-si (KR)

(72) Inventors: Yeri Jeong, Suwon-si (KR); Il-Joo Kim, Hwaseong-si (KR); Young-Soo Yoon, Seoul (KR); Wonjun Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,474

(22) Filed: Sep. 19, 2022

(65) Prior Publication Data

US 2023/0114212 A1    Apr. 13, 2023

Related U.S. Application Data

(63) Continuation of application No. 17/678,501, filed on Feb. 23, 2022, now Pat. No. 11,449,164.

(30) Foreign Application Priority Data

Oct. 12, 2021 (KR) .................. 10-2021-0134712

(51) Int. Cl.
  *G06F 3/041* (2006.01)
  *G06F 3/044* (2006.01)
(52) U.S. Cl.
  CPC ........ *G06F 3/0412* (2013.01); *G06F 3/04164* (2019.05)

(58) Field of Classification Search
  None
  See application file for complete search history.

(56) References Cited

U.S. PATENT DOCUMENTS

| 10,949,047 | B2 | 3/2021 | Na et al. |
| 11,169,634 | B2 | 11/2021 | Jeong et al. |
| 2017/0345847 | A1* | 11/2017 | Kim ................... H01L 27/1222 |

(Continued)

FOREIGN PATENT DOCUMENTS

| KR | 10-2019-0035354 A | 4/2019 |
| KR | 10-2019-0052327 A | 5/2019 |

(Continued)

*Primary Examiner* — Krishna P Neupane
(74) *Attorney, Agent, or Firm* — Lewis Roca Rothgerber Christie LLP

(57) ABSTRACT

A display device includes: a display layer having an active region, and a peripheral region including a first region, a second region spaced from the first region in a first direction, and a third region between the first region and the second region; and a sensor layer on the display layer. The display layer includes: a plurality of pixels at the active region; and a power supply pattern at the peripheral region, and including: a first power supply pattern at the first region; and a second power supply pattern at the second region. The sensor layer includes: a plurality of sensing electrodes at the active region; a plurality of sensing lines including: a first sensing line at the first region; and a second sensing line at at least one of the first region or the second region; and a dummy pattern at the third region.

20 Claims, 13 Drawing Sheets

(56) References Cited

U.S. PATENT DOCUMENTS

| | | |
|---|---|---|
| 2020/0083299 A1 | 3/2020 | Kim et al. |
| 2020/0203661 A1 | 6/2020 | Bae |
| 2020/0295092 A1 | 9/2020 | Moon et al. |
| 2021/0004135 A1 | 1/2021 | Kim et al. |
| 2021/0043715 A1* | 2/2021 | Han .................... H01L 27/3276 |

FOREIGN PATENT DOCUMENTS

| | | |
|---|---|---|
| KR | 10-2019-0140132 A | 12/2019 |
| KR | 10-2020-0031001 A | 3/2020 |

* cited by examiner

DISPLAY DEVICE

CROSS-REFERENCE TO RELATED APPLICATIONS

This application is a continuation of U.S. patent application Ser. No. 17/678,501, filed Feb. 23, 2022, which claims priority to and the benefit of Korean Patent Application No. 10-2021-0134712, filed Oct. 12, 2021, the entire content of both of which is incorporated herein by reference.

BACKGROUND

Aspects of embodiments of the present disclosure relate to a display device with improved reliability.

A display device may be a device including a display panel to display an image, an input sensor to sense an external input, and various suitable electronic components, such as an electronic module. The electronic components may be electrically connected to each other via signal lines. The electronic module may include a camera, an infrared detection sensor, a proximity sensor, or the like. The input sensor may be directly formed on the display panel. When the shape of the display panel is deformed, the shape of the input sensor may also be deformed together with the display panel.

The above and other aspects and features of the present disclosure will be more clearly understood from the following detailed description of the illustrative, non-limiting embodiments with reference to the accompanying drawings.

SUMMARY

One or more embodiments of the present disclosure are directed to a display device having improved reliability.

According to one or more embodiments of the present disclosure, a display device includes: a display layer having an active region, and a peripheral region including a first region, a second region spaced from the first region in a first direction, and a third region between the first region and the second region; and a sensor layer on the display layer. The display layer includes: a plurality of pixels at the active region, each of the pixels including a first electrode, a light-emitting layer, and a second electrode; and a power supply pattern at the peripheral region, and electrically connected to the plurality of pixels, the power supply pattern including: a first power supply pattern at the first region; and a second power supply pattern at the second region. The sensor layer includes: a plurality of sensing electrodes at the active region; a plurality of sensing lines electrically connected to the plurality of sensing electrodes, and including: a first sensing line at the first region; and a second sensing line at at least one of the first region or the second region; and a dummy pattern at the third region.

In an embodiment, the plurality of sensing lines may not overlap with the third region in a plan view.

In an embodiment, the first power supply pattern may overlap with the first sensing line in a plan view.

In an embodiment, the second power supply pattern may overlap with the second sensing line in a plan view.

In an embodiment, the second electrode may not overlap with the third region in a plan view.

In an embodiment, the sensor layer may further include a first guard pattern, and a second guard pattern spaced from the first guard pattern with the dummy pattern therebetween.

In an embodiment, the first guard pattern may be located at the first region, and the second guard pattern may be located at the second region.

In an embodiment, the first and second guard patterns and the plurality of sensing lines may be located at the same layer as each other.

In an embodiment, the first guard pattern may be located between the first sensing line and the dummy pattern.

In an embodiment, the first guard pattern may extend along the first sensing line.

In an embodiment, the second guard pattern may be located between the second sensing line and the dummy pattern.

In an embodiment, the second guard pattern may extend along the second sensing line.

In an embodiment, each of the first guard pattern and the second guard pattern may be configured to receive a constant voltage.

In an embodiment, the dummy pattern and the plurality of sensing lines may be located at the same layer as each other.

In an embodiment, the dummy pattern may include the same material as that of the plurality of sensing lines.

In an embodiment, the dummy pattern may be electrically floated.

In an embodiment, the dummy pattern may be located between the first power supply pattern and the second power supply pattern in a plan view.

In an embodiment, the second sensing line may include a first line, and a second line spaced from the first line in the first direction with the dummy pattern therebetween, and the first line may overlap with the first power supply pattern and the second line may overlap with the second power supply pattern in a plan view.

In an embodiment, sensing electrodes from among the plurality of sensing electrodes that faces the first power supply pattern may be electrically connected to the first line, and sensing electrodes from among the plurality of sensing electrodes that faces the second power supply pattern may be electrically connected to the second line.

In an embodiment, the first line may be on the first power supply pattern, and the second line may be on the second power supply pattern.

In an embodiment, the first power supply pattern may be configured to receive a first power voltage, and the second power supply pattern may be configured to receive a second power voltage having a different level from that of the first power voltage.

According to one or more embodiments of the present disclosure, a display device includes: a display layer having an active region and a peripheral region; and a sensor layer on the display layer. The display layer includes: a plurality of pixels at the active region; a power supply line configured to supply power to the plurality of pixels; and a power supply pattern at the peripheral region, and electrically connected to the power supply line, the power supply pattern including a first power supply pattern, and a second power supply pattern spaced from the first power supply pattern in a first direction. The sensor layer includes: a plurality of sensing electrodes at the active region; a plurality of sensing lines electrically connected to the plurality of sensing electrodes, and including: a first sensing line on the first power supply pattern; and a second sensing line on the second power supply pattern; and a dummy pattern located between the first power supply pattern and the second power supply pattern in a plan view.

In an embodiment, the plurality of sensing lines may not overlap with the dummy pattern in a plan view.

In an embodiment, the first power supply pattern may overlap with the first sensing line and the second power supply pattern may overlap with the second sensing line in a plan view.

In an embodiment, the dummy pattern and the plurality of sensing lines may include the same material as each other, and may be located at the same layer as each other.

In an embodiment, the dummy pattern may be electrically floated.

In an embodiment, the sensor layer may further include a first guard pattern, and a second guard pattern spaced from the first guard pattern with the dummy pattern therebetween.

In an embodiment, the first guard pattern may overlap with the first power supply pattern and the second guard pattern may overlap with the second power supply pattern in a plan view.

According to one or more embodiments of the present disclosure, a display device includes: a display layer having an active region and a peripheral region, the peripheral region including a first region, a second region spaced from the first region in a first direction, and a third region between the first region and the second region; and a sensor layer on the display layer. The display layer includes: a plurality of pixels at the active region, each pixel including a first electrode, a light-emitting layer, and a second electrode; a first power supply pattern at the peripheral region and electrically connected to the plurality of pixels, the first power supply pattern being located at the first region; and a second power supply pattern at the peripheral region and electrically connected to the plurality of pixels, the second power supply pattern being spaced from the first power supply pattern in the first direction and located at the second region. The sensor layer includes: a plurality of sensing electrodes at the active region; and a plurality of sensing lines electrically connected to the plurality of sensing electrodes, the plurality of sensing lines including a plurality of first sensing lines and a plurality of second sensing lines. In a plan view, the plurality of first sensing lines overlap with the first power supply pattern, and are spaced from the second power supply pattern, and in a plan view, the plurality of second sensing lines overlap with the second power supply pattern, and are spaced from the first power supply pattern.

In an embodiment, the plurality of sensing lines may not overlap with the third region.

In an embodiment, the plurality of first sensing lines and the plurality of second sensing lines may be spaced from each other with the third region therebetween in a plan view.

In an embodiment, the second electrode may not overlap with the plurality of first sensing lines and the plurality of second sensing lines in a plan view.

In an embodiment, the display device may further include: a first guard pattern between the plurality of first sensing lines and the third region in a plan view; and a second guard pattern between the plurality of second sensing lines and the third region in a plan view.

In an embodiment, the first guard pattern may be located at the first region, and the second guard pattern may be located at the second region.

In an embodiment, the first guard pattern may extend along the plurality of first sensing lines, and the second guard pattern may extend along the plurality of second sensing lines.

In an embodiment, each of the first guard pattern and the second guard pattern may be configured to receive a constant voltage.

BRIEF DESCRIPTION OF THE FIGURES

The above and other aspects and features of the present disclosure will be more clearly understood from the following detailed description of the illustrative, non-limiting embodiments with reference to the accompanying drawings, in which.

DETAILED DESCRIPTION

Figure 1:
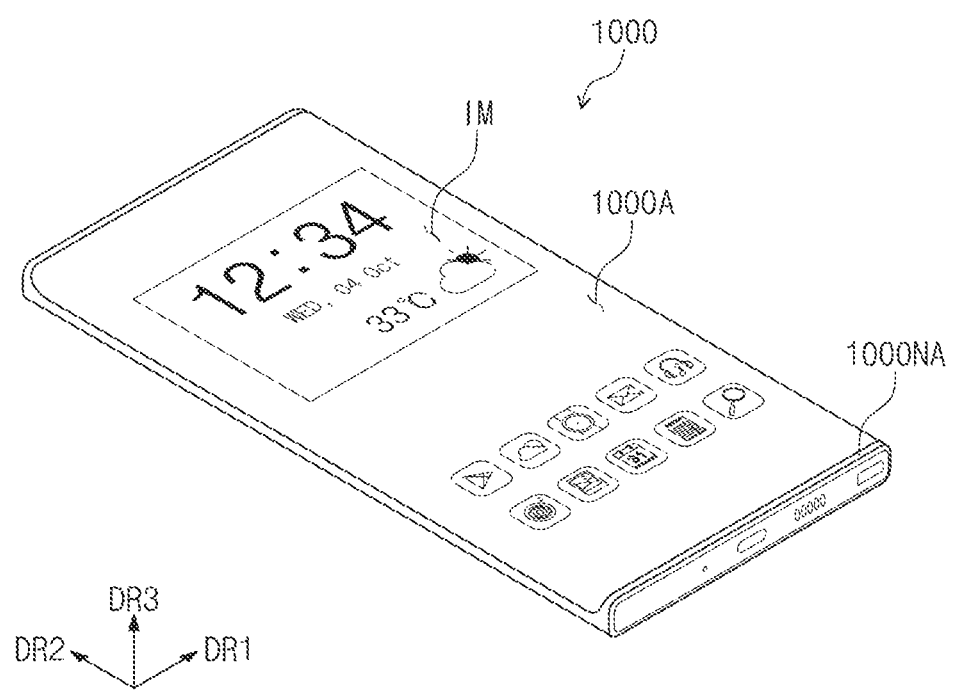
FIG. 1 is a perspective view of a display device according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. Thus, these terms are relative concepts, and are described based on the directions indicated in the drawings. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view of a display device according to an embodiment of the present disclosure.

Referring to FIG. 1, a display device 1000 may be a device that is activated in response to an electrical signal. For example, the display device 1000 may be a mobile phone, a tablet computer, a car navigation system, a game console, or a wearable device, but the present disclosure is not limited thereto. For convenience, FIG. 1 illustrates an example of the display device 1000 as a mobile phone, but the present disclosure is not limited thereto.

An active region 1000A and a peripheral region 1000NA may be defined in the display device 1000.

The active region 1000A may be a region in which an image IM is displayed. The active region 1000A may include a plane surface defined by a first direction DR1 and a second direction DR2 crossing the first direction DR1. The active region 1000A may further include curved surfaces, which are bent (e.g., curved) from at least two sides of the plane surface, respectively. However, the shape of the active region 1000A is not limited thereto. For example, the active region 1000A may include only the plane surface, or the active region 1000A may further include four curved surfaces that are bent from at least two sides (e.g., from four sides) of the plane surface, respectively.

The peripheral region 1000NA may be adjacent to the active region 1000A. The peripheral region 1000NA may surround (e.g., around a periphery of) the active region 1000A. However, the present disclosure is not limited thereto, and the shape of the active region 1000A and the shape of the peripheral region 1000NA may be relatively modified. In an embodiment of the present disclosure, the peripheral region 1000NA may be omitted.

A third direction DR3 may indicate a thickness direction of the display device 1000. The third direction DR3 may cross the first direction DR1 and the second direction DR2. A front surface (or an upper surface) and a rear surface (or a lower surface) of each member may be defined based on the third direction DR3. As used herein, the phrase "on a plane" or "in a plan view" may refer to a view from the third direction DR3.

Figure 2:
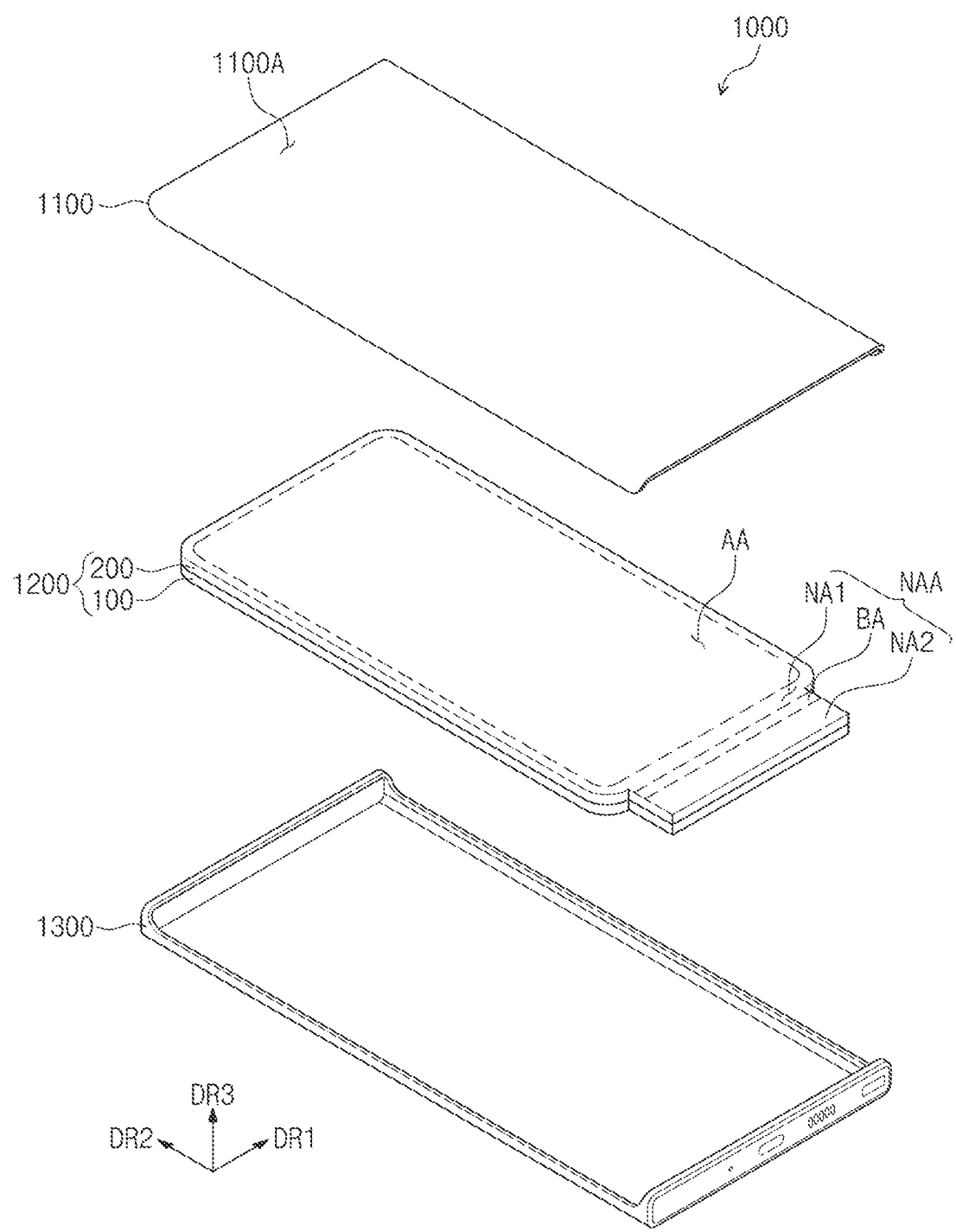
FIG. 2 is an exploded perspective view of a display device according to an embodiment of the present disclosure.

FIG. 2 is an exploded perspective view of a display device according to an embodiment of the present disclosure.

Referring to FIG. 2, a display device 1000 may include a window 1100, a display panel 1200, and an external case 1300. The window 1100 and the external case 1300 may be connected to (e.g., attached to or coupled to) each other to define an exterior of the display device 1000.

The display panel 1200 may include a display layer 100 and a sensor layer 200.

The display layer 100 may display an image IM (e.g., see FIG. 1). The display layer 100 according to an embodiment of the present disclosure may be a light-emitting display layer, but the present disclosure is not limited thereto. For example, the display layer 100 may be an organic light-emitting display layer, a quantum dot display layer, a nano-LED display layer, or a micro-LED display layer. The light-emitting layer of the organic light-emitting display layer may include an organic light-emitting material. The light-emitting layer of the quantum dot display layer may include quantum dots, quantum rods, and/or the like. The light-emitting layer of the nano LED display layer and the micro-LED display layer may include a small LED element having a size of several hundred micrometers or less. Hereinafter, for convenience, the display layer 100 will be described in more detail as an organic light-emitting display layer, but the present disclosure is not limited thereto.

The sensor layer 200 may be disposed on the display layer 100. The sensor layer 200 may acquire coordinate information pertaining to an external input. The sensor layer 200 may sense various suitable kinds of inputs (e.g., external inputs) supplied from the outside. For example, the sensor layer 200 may sense an input by a user's body (e.g., a user's finger), and/or various kinds of external inputs, for example, such as light, heat, or pressure. In addition, the sensor layer 200 may sense an input (e.g., a proximity input) that is close to a sensing surface, in addition to an input that contacts (e.g., that touches) the sensing surface.

An active region AA and a peripheral region NAA may be defined in the display layer 100 and the sensor layer 200. The active region AA may be a region in which the image IM (e.g., see FIG. 1) is displayed, and may also be a region for sensing an external input. The active region AA may overlap with the active region 1000A (e.g., see FIG. 1) of the display device 1000. For example, the active region AA may overlap with the entire surface of the active region 1000A, or may overlap with at least a portion of the active region 1000A of the display device 1000. Accordingly, a user may view the image IM, and/or may supply an external input via the active region AA. However, the present disclosure is not limited thereto, and in the active region 1000A (e.g., see FIG. 1) of the display device 1000, a region for displaying the image IM and a region for sensing the external input may be separate from each other, and is not particularly limited to any one embodiment.

The peripheral region NAA may overlap with the peripheral region 1000NA (e.g., see FIG. 1) of the display device 1000. The peripheral region NAA may surround (e.g., around a periphery of) the active region AA. A driving circuit and/or a driving line for driving the active region AA may be disposed at (e.g., in or on) the peripheral region NAA. Various signal lines and/or pads for supplying electrical signals, and/or electronic elements, may be disposed at (e.g., in or on) the active region AA.

A first non-bending region NA1, a bending region BA, and a second non-bending region NA2 may be defined at (e.g., in or on) the peripheral region NAA. The first non-bending region NA1 may be a region surrounding (e.g., around a periphery of) the active region AA. The second non-bending region NA2 may be a region spaced apart from the first non-bending region NA1 in the second direction DR2. The bending region BA may be disposed between the first non-bending region NA1 and the second non-bending region NA2. The bending region BA may face the first non-bending region NA1. A part of the peripheral region NAA may be bent, and the area of the peripheral region 1000NA (e.g., see FIG. 1) of the display device 1000 may be reduced. For example, the part of the peripheral region NAA that may be bent may correspond to (e.g., may be) the bending region BA.

The window 1100 may be disposed on the display panel 1200 to cover the active region AA. Edges of the window 1100 may be provided in the form of a curved surface. The window 1100 may include an optically transparent insulating material. For example, the window 1100 may include glass or plastic. The window 1100 may have a single-layer structure or a multi-layered structure. For example, the window 1100 may have a stacked structure in which a plurality of plastic films are bonded to one another by an adhesive, or a stacked structure in which a glass substrate and a plastic film are bonded to each other by an adhesive. In some embodiments, a light-blocking layer may be further disposed at (e.g., in or on) a region of the window 1100 overlapping with the peripheral region 1000NA.

The front surface 1100A of the window 1100 may define the active region 1000A (e.g., see FIG. 1) of the display device 1000.

In some embodiments, the window 1100 may further include a functional coating layer. The functional coating layer may include an anti-fingerprint layer, an anti-reflective layer, a hard coating layer, and/or the like.

The external case 1300 may be connected to (e.g., attached to or coupled to) the window 1100 to define the exterior of the display device 1000. FIG. 2 illustrates that the external case 1300 includes (e.g., is composed of) a single member as an example. However, the present disclosure is not limited thereto, and the external case 1300 may include two or more members that are assembled together.

Figure 3:
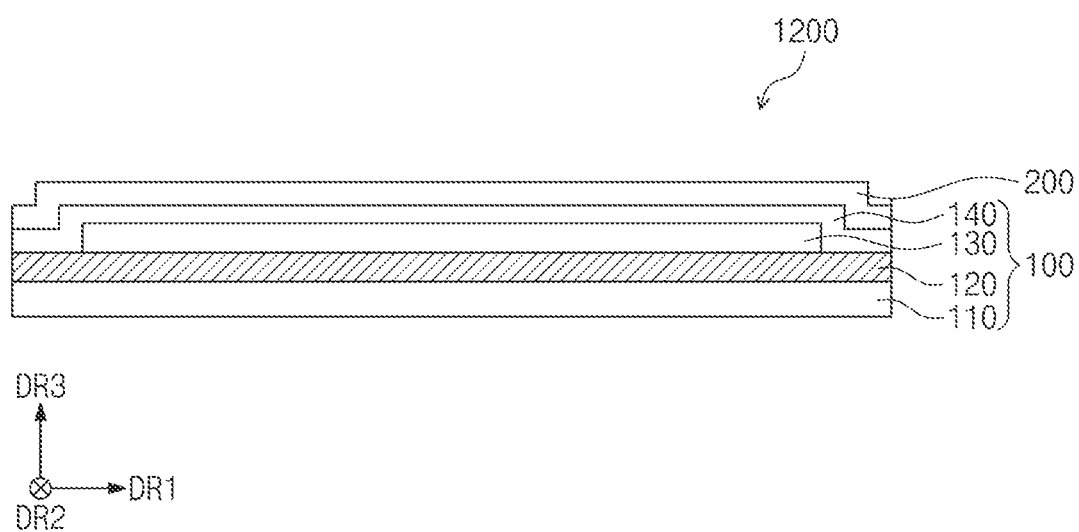
FIG. 3 is a schematic cross-sectional view of a display panel according to an embodiment of the present disclosure.

FIG. 3 is a schematic cross-sectional view of a display panel according to an embodiment of the present disclosure.

Referring to FIG. 3, a display panel 1200 may include a display layer 100 and a sensor layer 200.

The display layer 100 may include a base layer 110, a circuit layer 120, a light-emitting element layer 130, and an encapsulation layer 140.

The base layer 110 may be a member that provides a base surface on which the circuit layer 120 is disposed. The base layer 110 may include (e.g., may be) a glass substrate, a metal substrate, a polymer substrate, or the like. However, the present disclosure is not limited thereto, and the base layer 110 may include (e.g., may be) an inorganic layer, an organic layer, or a composite material layer.

The base layer 110 may have a multi-layered structure. For example, the base layer 110 may have a three-layered structure of a synthetic resin layer, an adhesive layer, and a synthetic resin layer. In more detail, the synthetic resin layer may include a polyimide-based resin. In addition, the synthetic resin layer may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. As used in the present disclosure, the phrase "~~"-based resin may refer to a resin including a functional group of "~~".

The circuit layer 120 may be disposed on the base layer 110. The circuit layer 120 may include an insulating layer, a semiconductor pattern, a conductive pattern, a signal line, and the like. An insulating layer, a semiconductor layer, and a conductive layer may be formed on the base layer 110 by coating, deposition, and/or the like, and may be selectively patterned by performing a photolithography process multiple times. Thereafter, the semiconductor pattern, the conductive pattern, and the signal line included in the circuit layer 120 may be formed.

The light-emitting element layer 130 may be disposed on the circuit layer 120. The light-emitting element layer 130 may include a light-emitting element. For example, the light-emitting element layer 130 may include an organic light-emitting material, a quantum dot, a quantum rod, a micro-LED, or a nano-LED. The light-emitting element layer 130 may also be referred to as a light-emitting layer 130.

The encapsulation layer 140 may be disposed on the light-emitting element layer 130. The encapsulation layer 140 may include a first inorganic layer, an organic layer, and a second inorganic layer, which are sequentially stacked on one another, but the layers constituting the encapsulation layer 140 are not limited thereto.

The inorganic layers may protect the light-emitting element layer 130 from moisture and oxygen, and the organic layer may protect the light-emitting element layer 130 from a foreign matter, for example, such as dust particles. The inorganic layers may include a silicon nitride layer, a silicon oxynitride layer, a silicon oxide layer, a titanium oxide layer, an aluminum oxide layer, or the like. The organic layer may include an acrylic organic layer, but the present disclosure is not limited thereto.

The sensor layer 200 may be disposed on the display layer 100. The sensor layer 200 may be formed on the display layer 100 through a continuous or substantially continuous process. In this case, the sensor layer 200 may be directly disposed on the display layer 100, such that a third component, for example, such as an adhesive member, is not disposed between the sensor layer 200 and the display layer 100. In other words, an adhesive member may not be separately disposed between the sensor layer 200 and the display layer 100. However, the present disclosure is not limited thereto, and in other embodiments, the sensor layer 200 may be attached to the display layer 100 by an adhesive member.

Figure 4:
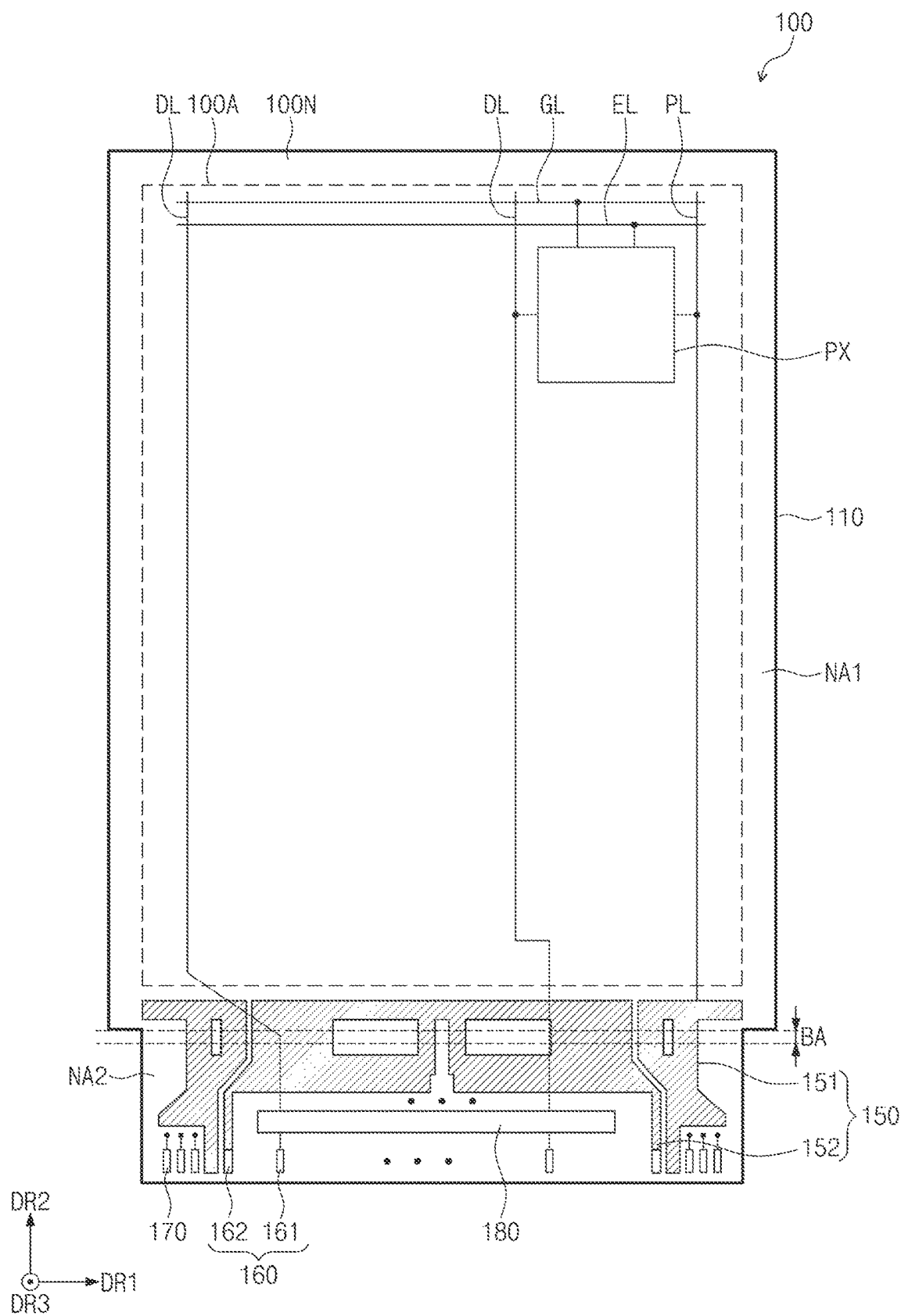
FIG. 4 is a plan view of a display layer according to an embodiment of the present disclosure.

FIG. 4 is a plan view of a display layer according to an embodiment of the present disclosure.

Referring to FIG. 4, an active region 100A and a peripheral region 100N may be defined in a display layer 100. The active region 100A may be a region that is activated in response to an electrical signal. For example, the active region 100A may display an image IM (e.g., see FIG. 1). The peripheral region 100N may be adjacent to the active region 100A, and may surround (e.g., around a periphery of) the active region 100A. A driving circuit, a driving line, and/or the like for driving the active region 100A may be disposed at (e.g., in or on) the peripheral region 100N.

The display layer 100 illustrated in FIG. 4 may be a display layer 100 before assembly. In an assembly process, a bending region BA defined in the peripheral region 100N may be bent to have a suitable curvature (e.g., a predetermined curvature). Accordingly, parts which are vertically disposed with respect to the bending region BA may be disposed to face each other.

The display layer 100 may include a base layer 110, a plurality of pixels PX, a plurality of signal lines GL, DL, PL, and EL, a power supply pattern 150, a plurality of display pads 160, a plurality of sensing pads 170, and a driving chip 180.

The plurality of pixels PX may each display a corresponding one of primary colors, or a corresponding one of mixed colors. The primary colors may include red, green, and blue. The mixed colors may include various suitable colors, for example, such as white, yellow, cyan, or magenta. However, the colors displayed by the pixels PX are not limited thereto.

The plurality of signal lines GL, DL, PL, and EL may be disposed on the base layer 110. The plurality of signal lines GL, DL, PL, and EL may be connected to the plurality of pixels PX to transmit an electrical signal to the plurality of pixels PX. The plurality of signal lines GL, DL, PL, and EL may include a plurality of scanning lines GL, a plurality of data lines DL, a plurality of power supply lines PL, and a plurality of light emission control lines EL. However, the present disclosure is not limited thereto, and the configurations of the plurality of signal lines GL, DL, PL, and EL according to various embodiments of the present disclosure are not limited thereto. For example, the plurality of signal lines GL, DL, PL, and EL according to an embodiment of the present disclosure may further include a reset voltage line.

The power supply pattern 150 may be disposed at (e.g., in or on) the peripheral region 100N. The power supply pattern 150 may be electrically connected to the power supply line PL. The power supply pattern 150 may include a first power supply pattern 151 and a second power supply pattern 152. A first power supply voltage may be supplied to the first power supply pattern 151. A second power supply voltage having a different level from that of the first power supply voltage may be supplied to the second power supply pattern 152.

The plurality of display pads 160 may include a first pad 161 and a second pad 162. The first pad 161 may be provided in a plurality, and the plurality of first pads 161 may be connected to the plurality of data lines DL, respectively. The second pad 162 may be electrically connected to the power supply line PL via the power supply pattern 150. The second pad 162 may be a part of the power supply pattern 150.

The display layer 100 may provide the plurality of pixels PX with electrical signals supplied from the outside via the display pads 160. The display pads 160 may further include pads for receiving other electrical signals, in addition to the first pad 161 and the second pad 162, but the present disclosure is not limited thereto.

The plurality of sensing pads 170 may be electrically connected to sensing electrodes of a sensor layer, which will be described in more detail below. Some sensing pads of the plurality of sensing pads 170 may be disposed to be spaced apart from each other with the plurality of display pads 160 therebetween. However, the present disclosure is not limited thereto, and the arrangement relationship between the plurality of sensing pads 170 and the plurality of display pads 160 may be variously modified as needed or desired.

The driving chip 180 may be mounted on the peripheral region 100N (e.g., at a second non-bending region NA2) of the display layer 100. The driving chip 180 may include (e.g., may be) a timing control circuit having a chip form. In this case, the plurality of data lines DL may be electrically connected to the first pads 161 via the driving chip 180. However, the present disclosure is not limited thereto, and the driving chip 180 may be mounted on a separate film from the display layer 100. In this case, the driving chip 180 may be electrically connected to the display pads 160 through the separate film.

Figure 5:
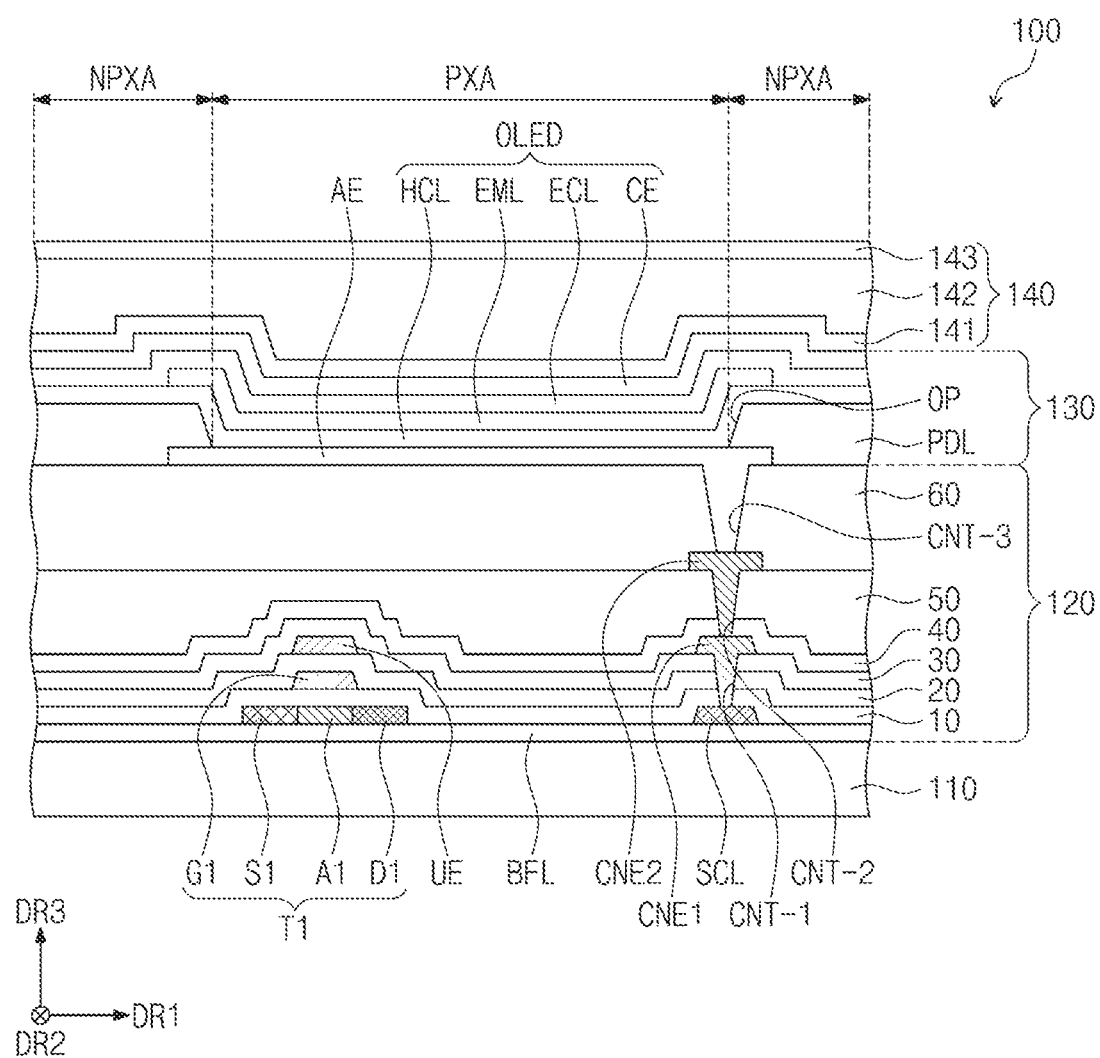
FIG. 5 is a cross-sectional view of a display layer according to an embodiment of the present disclosure.

FIG. 5 is a cross-sectional view of a display layer according to an embodiment of the present disclosure.

Referring to FIG. 5, a display layer 100 may include a base layer 110, a circuit layer 120, a light-emitting element layer 130, and an encapsulation layer 140. The display layer 100 may include a plurality of insulating layers, semiconductor patterns, conductive patterns, signal lines, and the like. An insulating layer, a semiconductor layer, and a conductive layer may be formed by coating, deposition, and/or the like. Thereafter, the insulating layer, the semiconductor layer, and the conductive layer may be selectively patterned by photolithography. Accordingly, the semiconductor patterns, the conductive patterns, the signal lines, and the like included in the circuit layer 120 and the light-emitting element layer 130 may be formed. The base layer 110 may be a base substrate that supports the circuit layer 120 and the light-emitting element layer 130.

The base layer 110 may include a synthetic resin layer. The synthetic resin layer may include a thermosetting resin. The base layer 110 may have a multi-layered structure. For example, the base layer 110 may include a first synthetic resin layer, a silicon oxide layer disposed on the first synthetic resin layer, an amorphous silicon layer disposed on the silicon oxide layer, and a second synthetic resin layer disposed on the amorphous silicon layer. The silicon oxide layer and the amorphous silicon layer may be referred to as a barrier layer.

The circuit layer 120 may be disposed on the base layer 110. The circuit layer 120 may provide a signal for driving a light-emitting element OLED included in the light-emitting element layer 130. The circuit layer 120 may include a buffer layer BFL, a transistor T1, a first insulating layer 10, a second insulating layer 20, a third insulating layer 30, a fourth insulating layer 40, a fifth insulating layer 50, and a sixth insulating layer 60.

The buffer layer BFL may enhance a bonding force between the base layer 110 and a semiconductor pattern. The buffer layer BFL may include a silicon oxide layer and a silicon nitride layer. The silicon oxide layer and the silicon nitride layer may be alternately stacked on one another.

The semiconductor pattern may be disposed on the buffer layer BFL. The semiconductor pattern may include polysilicon. However, the present disclosure is not limited thereto, and the semiconductor pattern may include amorphous silicon, or a metal oxide.

FIG. 5 illustrates an example of the semiconductor pattern, and other semiconductor patterns may be further disposed at (e.g., in or on) another region of a pixel PX on a plane (e.g., in a plan view). The semiconductor patterns may be arranged over a plurality of pixels PX in accordance with a suitable rule (e.g., a predetermined rule). The semiconductor pattern may have different electrical properties according to whether it is doped or not. The semiconductor pattern may include a first region having a higher conductivity, and a second region having a lower conductivity. The first region may be doped with an N-type dopant or a P-type dopant. A P-type transistor may include a doped region that is doped with the P-type dopant, and an N-type transistor may include a doped region that is doped with the N-type dopant. The second region may be an undoped region, or may be doped with a lower concentration than that of the first region.

The first region may have a higher conductivity than the second region, and the first region may serve or substantially serve as an electrode or a signal line. The second region may correspond to or substantially correspond to an active (or channel) of a transistor. In other words, a part of a semiconductor pattern may be an active of a transistor, another part may be a source or drain of the transistor, and still another part may be a connection electrode or a connection signal line.

A plurality of pixels PX (e.g., see FIG. 4) may each have an equivalent circuit including seven transistors, one capacitor, and a light-emitting element, but the present disclosure is not limited thereto, and the equivalent circuit of a pixel may be variously modified. FIG. 5 illustrates as an example that each of the plurality of pixels PX (e.g., see FIG. 4) includes at least a transistor T1 and a light-emitting element OLED. The transistor T1 may include a source S1, an active A1, a drain D1, and a gate G1.

The source S1, the active A1, and the drain D1 of the transistor T1 may be formed from a semiconductor pattern. The source S1 and the drain D1 may extend from the active A1 in opposite directions from each other in a cross-section. FIG. 5 further illustrates a part of a connection signal line SCL formed from a semiconductor pattern.

The first insulating layer 10 may be disposed on the buffer layer BFL. The first insulating layer 10 may overlap with the plurality of pixels PX (e.g., see FIG. 4) in common, and may cover the semiconductor pattern. The first insulating layer 10 may be an inorganic layer and/or an organic layer, and may have a single-layer structure or a multi-layered structure. The first insulating layer 10 may include at least one of aluminum oxide, titanium oxide, silicon oxide, silicon oxynitride, silicon nitride, zirconium oxide, or hafnium oxide. In the present embodiment, the first insulating layer 10 may be a single-layer silicon oxide layer. Further, in addition to the first insulating layer 10, a below-described insulating layer of the circuit layer 120 may be an inorganic layer and/or an organic layer, and may have a single-layer structure or a multi-layered structure. The inorganic layer may include at least one of the aforementioned materials.

The gate G1 may be disposed on the first insulating layer 10. The gate G1 may be a part of a metal pattern. The gate G1 may overlap with the active A1. In the doping process for the semiconductor pattern, the gate G1 may serve as a mask.

The second insulating layer 20 may be disposed on the first insulating layer 10. The second insulating layer 20 may cover the gate G1. The second insulating layer 20 may overlap with the plurality of pixels PX in common. The second insulating layer 20 may be an inorganic layer and/or an organic layer, and may have a single-layer structure or a multi-layered structure.

An upper electrode UE may be disposed on the second insulating layer 20. The upper electrode UE may overlap with the gate G1. The upper electrode UE may be a part of a metal pattern. A part of the gate G1 and a part of the upper electrode UE overlapping with the gate G1 may define a capacitor. However, this is an example, and the upper electrode UE according to an embodiment of the present disclosure may be omitted as needed or desired.

The third insulating layer 30 may be disposed on the second insulating layer 20. The third insulating layer 30 may cover the upper electrode UE. The third insulating layer 30 may be an inorganic layer and/or an organic layer, and may have a single-layer structure or a multi-layered structure. A first connection electrode CNE1 may be disposed on the third insulating layer 30. The first connection electrode CNE1 may be connected to the connection signal line SCL through a contact hole CNT-1 penetrating the first to third insulating layers 10, 20, and 30.

The fourth insulating layer 40 may be disposed on the third insulating layer 30. The fourth insulating layer 40 may cover the first connection electrode CNE1. The fourth insulating layer 40 may be an inorganic layer and/or an organic layer, and may have a single-layer structure or a multi-layered structure.

The fifth insulating layer 50 may be disposed on the fourth insulating layer 40. The fifth insulating layer 50 may be an organic layer. A second connection electrode CNE2 may be disposed on the fifth insulating layer 50. The second connection electrode CNE2 may be connected to the first connection electrode CNE1 through a contact hole CNT-2 penetrating the fourth insulating layer 40 and the fifth insulating layer 50.

The sixth insulating layer 60 may be disposed on the fifth insulating layer 50. The sixth insulating layer 60 may cover the second connection electrode CNE2. The sixth insulating layer 60 may be an organic layer.

The light-emitting element layer 130 may include a first electrode AE, a pixel-defining film PDL, and a light-emitting element OLED.

The first electrode AE may be disposed on the sixth insulating layer 60. The first electrode AE may be connected to the second connection electrode CNE2 through a contact hole CNT-3 penetrating the sixth insulating layer 60.

The pixel-defining film PDL may be disposed on the sixth insulating layer 60, and may cover at least a portion of the first electrode AE. An opening OP may be defined in the pixel-defining film PDL. The opening OP of the pixel-defining film PDL may expose at least a part of the first electrode AE.

The active region 100A (e.g., see FIG. 4) may include a light-emitting region PXA, and a non-light-emitting region NPXA adjacent to the light-emitting region PXA. The non-light-emitting region NPXA may surround (e.g., around a periphery of) the light-emitting region PXA. In the present embodiment, the light-emitting region PXA is defined to correspond to the part of the first electrode AE that is exposed by the opening OP.

The light-emitting element OLED may include a hole control layer HCL, a light-emitting layer EML, an electron control layer ECL, and a second electrode CE. The hole control layer HCL may be disposed, in common, at (e.g., in or on) the light-emitting region PXA and the non-light-emitting region NPXA. The hole control layer HCL may include a hole transport layer, and may further include a hole injection layer. The light-emitting layer EML may be disposed on the hole control layer HCL. The light-emitting layer EML may be disposed at (e.g., in or on) a region corresponding to the opening OP. In other words, the light-emitting layer EML may be separated and formed for each of the pixels PX.

The electron control layer ECL may be disposed on the light-emitting layer EML. The electron control layer ECL may include an electron transport layer, and may further include an electron injection layer. The hole control layer HCL and the electron control layer ECL may be formed, in common, for the plurality of pixels PX using an open mask.

The second electrode CE may be disposed on the electron control layer ECL. The second electrode CE may have an integrated shape. The second electrode CE may be disposed, in common, for the plurality of pixels PX. The second electrode CE may be referred to as a common electrode CE.

The encapsulation layer 140 may be disposed on the light-emitting element layer 130 to cover the light-emitting element layer 130. The encapsulation layer 140 may include a first inorganic encapsulation layer 141, an organic encapsulation layer 142, and a second inorganic encapsulation layer 143, which are sequentially stacked on one another in the third direction DR3. However, the present disclosure is not limited thereto, and the encapsulation layer 140 according to an embodiment of the present disclosure may have various suitable structures. For example, the encapsulation layer 140 according to an embodiment of the present disclosure may further include a plurality of inorganic layers and a plurality of organic layers.

The first inorganic encapsulation layer 141 may prevent or substantially prevent external moisture and/or oxygen from infiltrating into the light-emitting element layer 130. For example, the first inorganic encapsulation layer 141 may include silicon nitride, silicon oxynitride, silicon oxide, or a compound obtained through a suitable combination thereof.

The organic encapsulation layer 142 may be disposed on the first inorganic encapsulation layer 141 to provide a flat or substantially flat surface. An uneven section that may be formed along the upper surface of the first inorganic encapsulation layer 141, particles existing on the first inorganic encapsulation layer 141, and/or the like may be covered with the organic encapsulation layer 142. For example, the organic encapsulation layer 142 may include an acrylic organic layer, but the present disclosure is not limited thereto.

The second inorganic encapsulation layer 143 may be disposed on the organic encapsulation layer 142 to cover the organic encapsulation layer 142. The second inorganic encapsulation layer 143 may prevent or substantially prevent infiltration of external moisture and/or oxygen. The second inorganic encapsulation layer 143 may include silicon nitride, silicon oxynitride, silicon oxide, or a compound obtained through a suitable combination thereof.

Figure 6A:
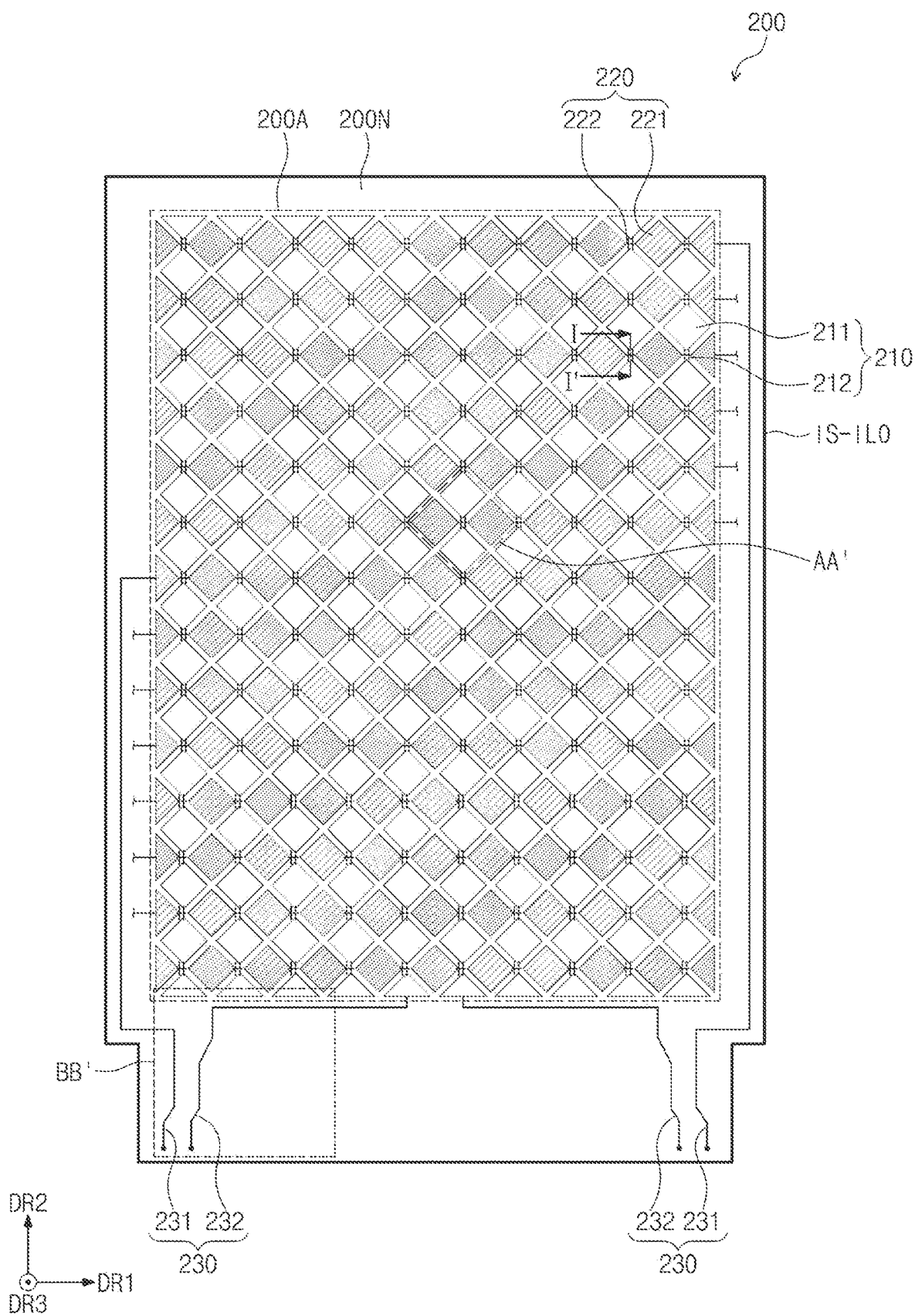
FIG. 6A is a plan view of a sensor layer according to an embodiment of the present disclosure.
Figure 6B:
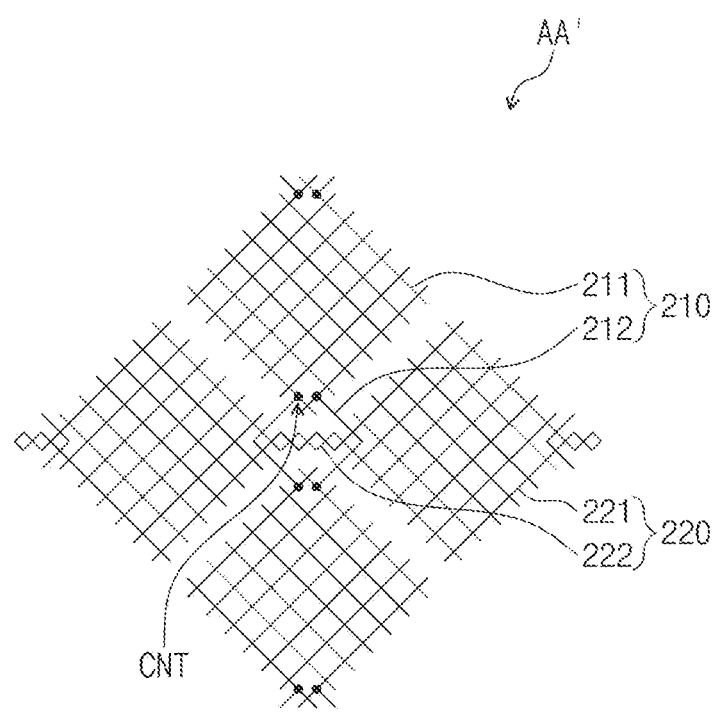
FIG. 6B is an enlarged plan view illustrating the region AA' in FIG. 6A according to an embodiment of the present disclosure.

FIG. 6A is a plan view of a sensor layer according to an embodiment of the present disclosure, and FIG. 6B is an enlarged plan view illustrating the region AA' in FIG. 6A according to an embodiment of the present disclosure.

Referring to FIGS. 6A and 6B, an active region 200A and a peripheral region 200N may be defined in a sensor layer 200. The active region 200A may be a region activated in response to an electrical signal. For example, the active region 200A may be an input-sensing region. The peripheral region 200N may be adjacent to the active region 200A, and may surround (e.g., around a periphery of) the active region 200A.

The sensor layer 200 may include a base insulating layer IS-IL0, a plurality of sensing electrodes 210 and 220, and a plurality of sensing lines 230. The plurality of sensing electrodes 210 and 220 may include a plurality of first sensing electrodes 210 and a plurality of second sensing electrodes 220. The plurality of first sensing electrodes 210 and the plurality of second sensing electrodes 220 may be disposed at (e.g., in or on) the active region 200A. The plurality of sensing lines 230 may be disposed at (e.g., in or on) the peripheral region 200N. The sensor layer 200 may acquire information about an external input through a change in mutual capacitance between the plurality of first sensing electrodes 210 and the plurality of second sensing electrodes 220.

The plurality of first sensing electrodes 210 may be arranged along the first direction DR1. The plurality of first sensing electrodes 210 may each extend in the second direction DR2. The plurality of first sensing electrodes 210 may each include a plurality of sensing patterns 211 and a plurality of connection patterns 212. Each of the plurality of connection patterns 212 may electrically connect two corresponding sensing patterns 211 that are adjacent to each other. The two sensing patterns 211 that are adjacent to each other may be connected to each other by two connection patterns 212, but the present disclosure is not limited thereto. The plurality of sensing patterns 211 may have a mesh pattern.

The plurality of second sensing electrodes 220 may be arranged along the second direction DR2. The plurality of second sensing electrodes 220 may each extend in the first direction DR1. The plurality of second sensing electrodes 220 may each include a plurality of first portions 221 and a plurality of second portions 222. Each of the plurality of second portions 222 may electrically connect two corresponding first portions 221 that are adjacent to each other. The two first portions 221 that are adjacent to each other may be connected to each other by one second portion 222, but the present disclosure is not limited thereto. Two connection patterns 212 and one second portion 222 may cross each other, and may be insulated from each other. The plurality of first portions 221 and the plurality of second portions 222 may each have a mesh pattern.

Figure 6B:
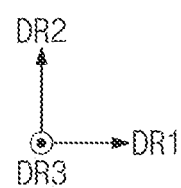

FIG. 6 illustrates an example of a shape and an arrangement relationship of the plurality of first sensing electrodes 210 and the plurality of second sensing electrodes 220, but the present disclosure is not limited thereto, and the shape and the arrangement relationship of the plurality of first sensing electrodes 210 and the plurality of second sensing electrodes 220 that constitute the sensor layer 200 are not limited to those illustrated in FIG. 6.

The plurality of sensing lines 230 may be electrically connected to a plurality of sensing pads 170 (e.g., see FIG. 4) through contact holes, respectively. The plurality of sensing lines 230 may include a plurality of first sensing lines 231 and a plurality of second sensing lines 232.

The plurality of first sensing lines 231 may be electrically connected to the plurality of second sensing electrodes 220, respectively. The plurality of second sensing lines 232 may be electrically connected to the plurality of first sensing electrodes 210, respectively. A part of the plurality of first sensing lines 231 may be connected to a left side of a part of the plurality of second sensing electrodes 220, and another part of the plurality of first sensing lines 231 may be connected to a right side of another part of the plurality of second sensing electrodes 220. However, the connection relationship between the plurality of first sensing lines 231 and the plurality of second sensing electrodes 220, and the connection relationship between the plurality of second sensing lines 232 and the plurality of first sensing electrodes 210 are not limited to the example illustrated in FIG. 6.

Figure 7:
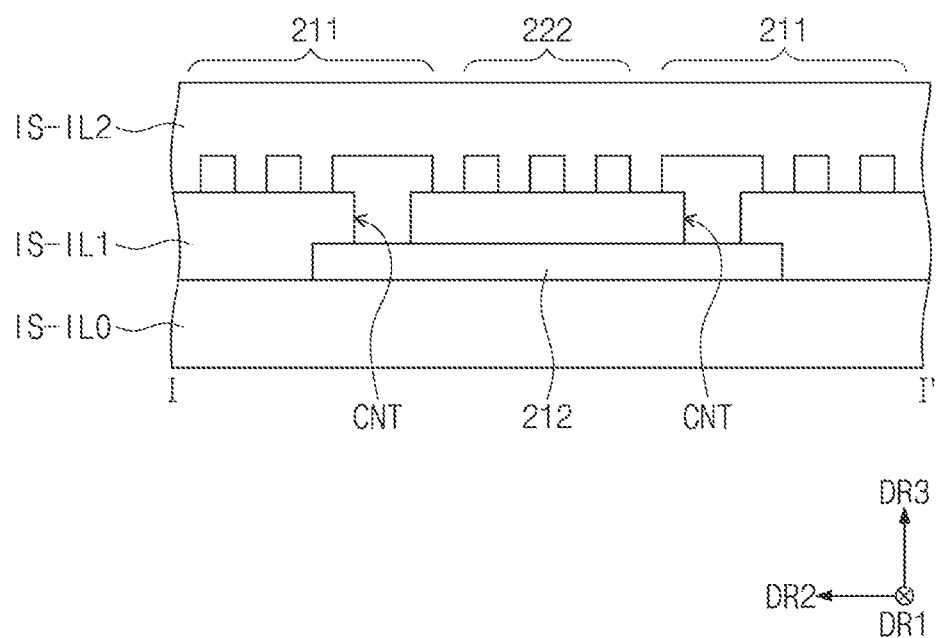
FIG. 7 is a cross-sectional view taken along the line I-I' in FIG. 6A according to an embodiment of the present disclosure.

FIG. 7 is a cross-sectional view taken along the line I-I' in FIG. 6A according to an embodiment of the present disclosure.

Referring to FIGS. 6A, 6B, and 7, the plurality of connection patterns 212 may be disposed on the base insulating layer IS-IL0. A first sensor insulating layer IS-IL1 may be disposed on the plurality of connection patterns 212. The first sensor insulating layer IS-IL1 may have a single-layer structure or a multi-layered structure. The first sensor insulating layer IS-IL1 may include an inorganic material, an organic material, or a suitable composite material.

The plurality of sensing patterns 211, the plurality of first portions 221, and the plurality of second portions 222 may be disposed on the first sensor insulating layer IS-IL1. The plurality of sensing patterns 211, the plurality of first portions 221, and the plurality of second portions 222 may have a mesh structure.

A plurality of contact holes CNT may be formed to penetrate the first sensor insulating layer IS-IL1 in the third direction DR3. Two adjacent sensing patterns 211 from among the plurality of sensing patterns 211 may be electrically connected to corresponding ones of the connection patterns 212 through the plurality of contact holes CNT.

A second sensor insulating layer IS-IL2 may be disposed on the plurality of sensing patterns 211, the plurality of first portions 221, and the plurality of second portions 222. The second sensor insulating layer IS-IL2 may have a single-layer structure or a multi-layered structure. The second sensor insulating layer IS-IL2 may include an inorganic material, an organic material, or a suitable composite material.

As an example, FIG. 7 illustrates a bottom bridge structure in which the plurality of connection patterns 212 are disposed under (e.g., underneath) the plurality of sensing patterns 211, the plurality of first portions 221, and the plurality of second portions 222, but the present disclosure is not limited thereto. As another example, the sensor layer 200 may have a top bridge structure in which the plurality of connection patterns 212 are disposed on (e.g., and above) the plurality of sensing patterns 211, the plurality of first portions 221, and the plurality of second portions 222.

Figure 8:
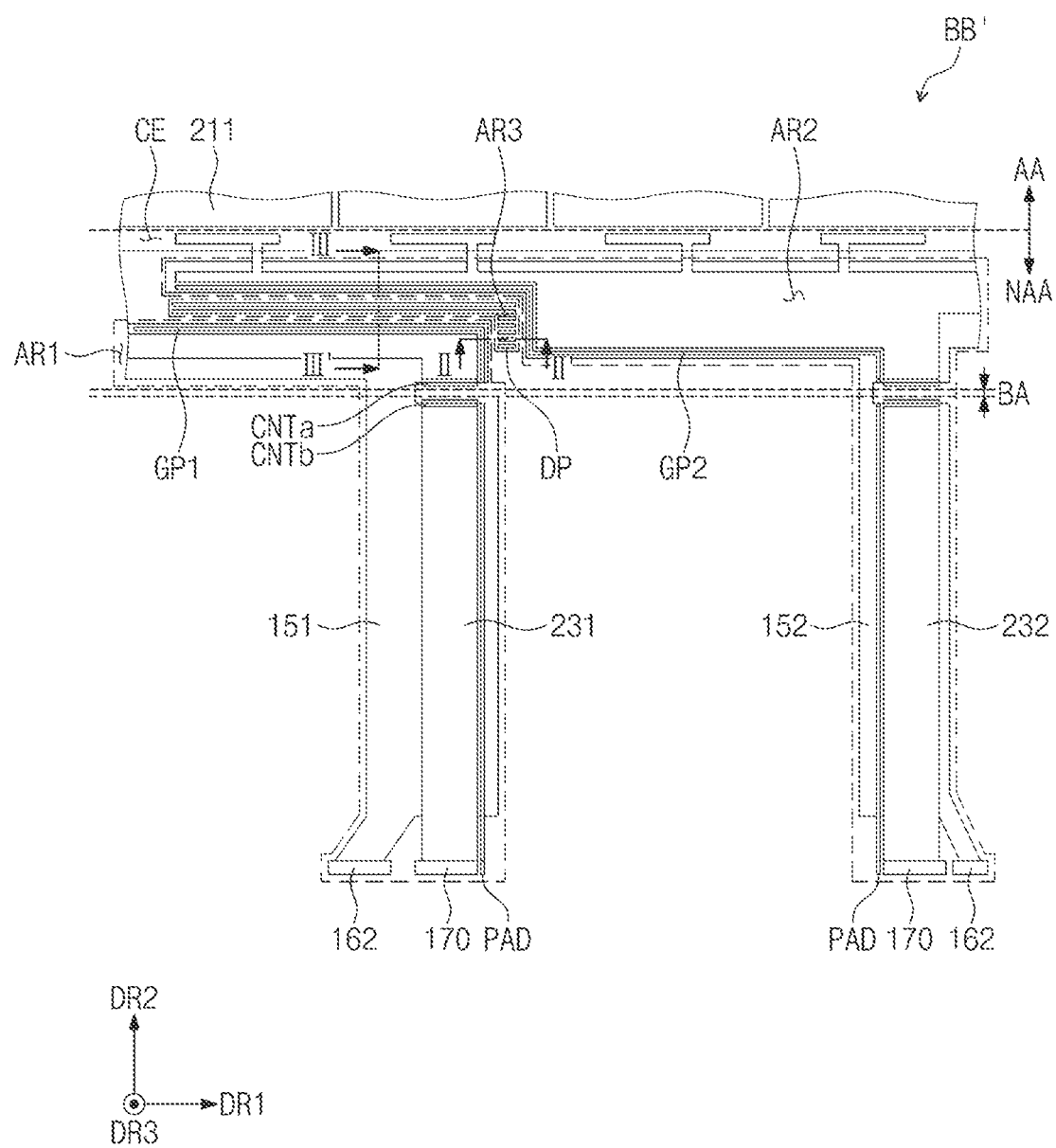
FIG. 8 is a plan view illustrating a region of a display device corresponding to the region BB' in FIG. 6A according to an embodiment of the present disclosure.

FIG. 8 is a plan view illustrating a region of a display device corresponding to the region BB' in FIG. 6A according to an embodiment of the present disclosure.

Referring to FIGS. 4, 6A, and 8, the peripheral region 100N of the display layer 100 may include a first region AR1, a second region AR2, and a third region AR3. The peripheral region 100N of the display layer 100 may correspond to the peripheral region NAA of the display panel 1200 (e.g., see FIG. 2).

The first region AR1 and the second region AR2 may be spaced apart from each other with the third region AR3 therebetween.

A first power supply pattern 151 may be disposed at (e.g., in or on) the first region AR1. The first power supply pattern 151 may be electrically connected to one of the second pads 162. A first power supply voltage may be supplied to the first power supply pattern 151.

A second power supply pattern 152 may be disposed at (e.g., in or on) the second region AR2. The second power supply pattern 152 may be spaced apart from the first power supply pattern 151. The second power supply pattern 152 may be electrically connected to another one of the second pads 162. A second power supply voltage having a different level from that of the first power supply voltage may be supplied to the second power supply pattern 152. For example, the level of the second power supply voltage may be higher than that of the first power supply voltage, but the present disclosure is not limited thereto.

A plurality of sensing patterns 211 may be disposed at (e.g., in or on) an active region AA.

A plurality of first sensing lines 231 may be disposed at (e.g., in or on) the first region AR1. When viewed on a plane (e.g., in a plan view), the plurality of first sensing lines 231 may overlap with the first power supply pattern 151. The plurality of first sensing lines 231 may each be electrically connected through a first contact CNTa and a second contact CNTb in a region adjacent to the bending region BA. The first contact CNTa and the second contact CNTb may enable the plurality of first sensing lines 231 to be easily bent in the bending region BA. The plurality of first sensing lines 231 may be electrically connected to a part of the plurality of sensing pads 170.

A plurality of second sensing lines 232 may be disposed at (e.g., in or on) the second region AR2. When viewed on a plane (e.g., in a plan view), the plurality of second sensing lines 232 may overlap with the second power supply pattern 152. The plurality of second sensing lines 232 may each be electrically connected through a plurality of contact holes in a region adjacent to the bending region BA. The plurality of second sensing lines 232 may be electrically connected to another part of the plurality of sensing pads 170.

When viewed on a plane (e.g., in a plan view), the plurality of first sensing lines 231 and the plurality of second sensing lines 232 may not overlap with the third region AR3.

The sensor layer 200 may further include a dummy pattern DP. The dummy pattern DP may be disposed at (e.g., in or on) the third region AR3.

When viewed on a plane (e.g., in a plan view), the dummy pattern DP may be disposed between the first power supply pattern 151 and the second power supply pattern 152.

The sensor layer 200 may further include a first guard pattern GP1 and a second guard pattern GP2 that are spaced apart from each other with the dummy pattern DP therebetween.

The first guard pattern GP1 may be disposed at (e.g., in or on) the first region AR1. The first guard pattern GP1 may be disposed between the plurality of first sensing lines 231 and the dummy pattern DP. The first guard pattern GP1 may extend along a first sensing line that is the outermost sensing line from among the plurality of first sensing lines 231. The first guard pattern GP1 may be electrically connected through a plurality of contact holes in a region adjacent to the bending region BA.

The second guard pattern GP2 may be disposed at (e.g., in or on) the second region AR2. The second guard pattern GP2 may be disposed between the plurality of second sensing lines 232 and the dummy pattern DP. The second guard pattern GP2 may extend along a second sensing line that is the outermost sensing line from among the plurality of second sensing lines 232. The second guard pattern GP2 may be electrically connected through a plurality of contact holes in a region adjacent to the bending region BA.

The first guard pattern GP1 may protect the plurality of first sensing lines 231. The second guard pattern GP2 may protect the plurality of second sensing lines 232. For example, the first guard pattern GP1 may protect the first sensing line that is the outermost sensing line from among the plurality of first sensing lines 231, and the second guard pattern GP2 may protect the second sensing line that is the outermost sensing line from among the plurality of second sensing lines 232.

The first guard pattern GP1 and the second guard pattern GP2 may each be electrically connected to pads PAD. A constant voltage may be supplied to each of the first guard pattern GP1 and the second guard pattern GP2 from the pads PAD.

A signal supplied to each of the plurality of first sensing lines 231 may be affected by signals supplied to adjacent first sensing lines. A signal of the outermost first sensing line disposed in a region adjacent to the third region AR3 may be affected by a signal supplied to an adjacent first sensing line (e.g., to one adjacent first sensing line). In addition, the signal of the outermost first sensing line may be affected by a constant voltage of the first guard pattern GP1. Accordingly, a difference between a degree in which the outermost first sensing line is affected and a degree in which another first sensing line is affected may be reduced. A signal of each of the plurality of second sensing lines 232 may be affected by signals supplied to adjacent second sensing lines. A signal of the outermost second sensing line disposed in a region adjacent to the third region AR3 may be affected by a signal supplied to an adjacent second sensing line (e.g., to one adjacent second sensing line). In addition, a signal of the outermost second sensing line may be affected by a constant voltage of the second guard pattern GP2. Accordingly, a difference between a degree in which the outermost second sensing line is affected and a degree in which another second sensing line is affected may be reduced.

According to one or more embodiments of the present disclosure, the first guard pattern GP1 and the second guard pattern GP2 may reduce the difference between the degree in which the outermost sensing line is affected by one or more adjacent sensing lines, and the degree in which other sensing lines are each affected. Accordingly, a display device 1000 (e.g., see FIG. 1) with improved reliability of a signal supplied to the sensor layer 200 may be provided.

The second electrode CE may be formed on a portion of the peripheral region NAA and the active region AA. The area of the second electrode CE disposed in the peripheral region NAA may be changed due to a process tolerance. As an example, FIG. 8 illustrates that a region in which the second electrode CE is formed is provided to have a reduced or minimum area due to the process tolerance. In this case, when viewed on a plane (e.g., in a plan view), the third region AR3 may not overlap with the second electrode CE.

According to one or more embodiments of the present disclosure, the area of the second electrode CE disposed at (e.g., in or on) the peripheral region NAA may be reduced. Accordingly, the area of the peripheral region NAA of the display device 1000 (e.g., see FIG. 1) may be reduced.

In a comparative example, unlike in one or more embodiments of the present disclosure, in a case where the plurality of sensing lines 230 are disposed at (e.g., in or on) the third region AR3, the sensing lines 230 may be affected by signals supplied to a plurality of signal lines GL, DL, PL, and EL disposed at (e.g., in or on) the display layer 100 when the second electrode CE does not cover the third region AR3. This may cause noise in a touch coordinate sensed by the plurality of sensing electrodes 210 and 220. However, according to one or more embodiments of the present disclosure, when viewed on a plane (e.g., in a plan view), the plurality of first sensing lines 231 may overlap with the first power supply pattern 151, and the plurality of second sensing lines 232 may overlap with the second power supply pattern 152. An effect by signals supplied to the plurality of signal lines GL, DL, PL, and EL disposed at (e.g., in or on) the display layer 100 may be blocked by the first power supply pattern 151 and the second power supply pattern 152. Accordingly, it may be possible to prevent or substantially prevent the noise caused by such an effect, which may occur due to such an effect in the touch coordinate sensed by the plurality of sensing electrodes 210 and 220. Accordingly, a display device 1000 (e.g., see FIG. 1) with improved reliability may be provided.

Figure 9:
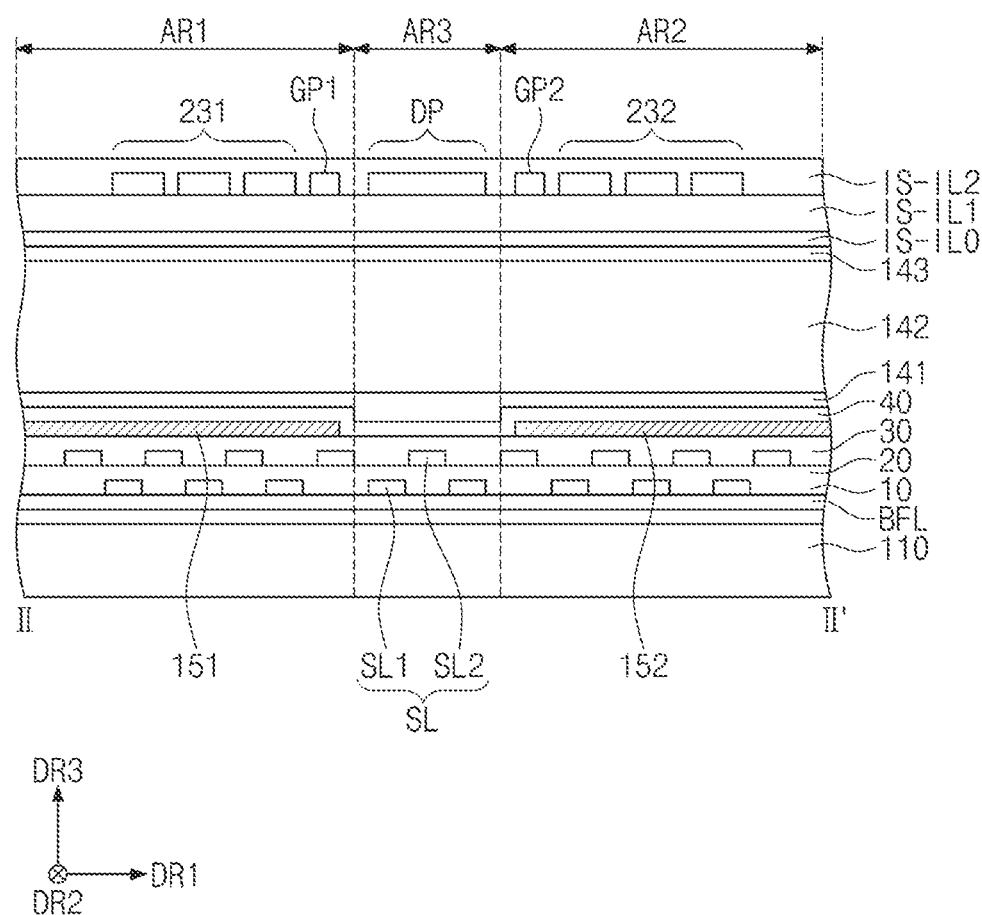
FIG. 9 is a cross-sectional view taken along the line II-II' in FIG. 8 according to an embodiment of the present disclosure.

FIG. 9 is a cross-sectional view taken along the line II-II' in FIG. 8 according to an embodiment of the present disclosure. In FIG. 9, the same reference symbols are used to denote the same or substantially the same components described above with reference to FIGS. 5 and 7, and thus, redundant description thereof may not be repeated.

Referring to FIG. 9, a plurality of signal lines SL may include a plurality of first signal lines SL1 and a plurality of second signal lines SL2. The plurality of signal lines SL may correspond to (e.g., may refer to or may indicate) the plurality of signal lines GL, DL, PL, and EL described above with reference to FIG. 4.

The plurality of first signal lines SL1 may be disposed on a first insulating layer 10. A second insulating layer 20 may cover the plurality of first signal lines SL1.

The plurality of second signal lines SL2 may be disposed on the second insulating layer 20. A third insulating layer 30 may cover the plurality of second signal lines SL2.

A first power supply pattern 151 may be disposed on the third insulating layer 30. A second power supply pattern 152 may be disposed on the third insulating layer 30. A fourth insulating layer 40 may cover the first power supply pattern 151 and the second power supply pattern 152.

A first inorganic encapsulation layer 141 may be disposed on the fourth insulating layer 40. However, the present disclosure is not limited thereto, and the stacked structure of the plurality of signal lines SL, the first power supply pattern 151, and the second power supply pattern 152 is not limited thereto. For example, the first power supply pattern 151 and the second power supply pattern 152 may be stacked on various suitable layers, as long as they are disposed on the plurality of signal lines SL, and the plurality of signal lines SL may be disposed on the first insulating layer 10 and the second insulating layer 20.

A first sensing line 231, a first guard pattern GP1, a dummy pattern DP, a second guard pattern GP2, and a second sensing line 232 may be disposed on a first sensor insulating layer IS-IL1. However, the present disclosure is not limited thereto, and the stacked structure of the first sensing line 231, the first guard pattern GP1, the dummy pattern DP, the second guard pattern GP2, and the second sensing line 232 is not limited thereto. For example, the first sensing line 231, the first guard pattern GP1, the dummy pattern DP, the second guard pattern GP2, and the second sensing line 232 may be disposed on a base insulating layer IS-IL0.

The first sensing line 231 may be disposed on the first power supply pattern 151. The second sensing line 232 may be disposed on the second power supply pattern 152.

The first guard pattern GP1, the second guard pattern GP2, and the plurality of sensing lines 231 and 232 may be disposed at (e.g., in or on) the same layer as each other. The first guard pattern GP1, the second guard pattern GP2, and the plurality of sensing lines 231 and 232 may include the same material as each other. The first guard pattern GP1, the second guard pattern GP2, and the plurality of sensing lines 231 and 232 may be formed through the same or substantially the same process as each other.

The first guard pattern GP1 may be disposed between the first sensing line 231 and the dummy pattern DP. The second guard pattern GP2 may be disposed between the second sensing line 232 and the dummy pattern DP.

The dummy pattern DP and the plurality of sensing lines 231 and 232 may be disposed at (e.g., in or on) the same layer as each other. The dummy pattern DP and the plurality of sensing lines 231 and 232 may include the same material as each other. The dummy pattern DP may be floated (e.g., may be electrically floated). The dummy pattern DP and the plurality of sensing lines 231 and 232 may be formed through the same or substantially the same process as each other.

Unlike one or more embodiments of the present disclosure, in a case where the dummy pattern DP is not disposed at (e.g., in or on) the third region AR3, the third region AR3 may be visible from the outside due to a difference between the stacked structure of each of the first region AR1 and the second region AR2, and the stacked structure of the third region AR3. However, according to one or more embodiments of the present disclosure, the dummy pattern DP and the plurality of sensing lines 231 and 232 may be disposed at (e.g., in or on) the same layer as each other. Thus, the reflectance of external light at the third region AR3 by the dummy pattern DP may have a similar value to the reflectance of the external light at each of the first region AR1 and the second region AR2. Accordingly, the third region AR3 may be prevented or substantially prevented from being viewed from the outside.

Figure 10:
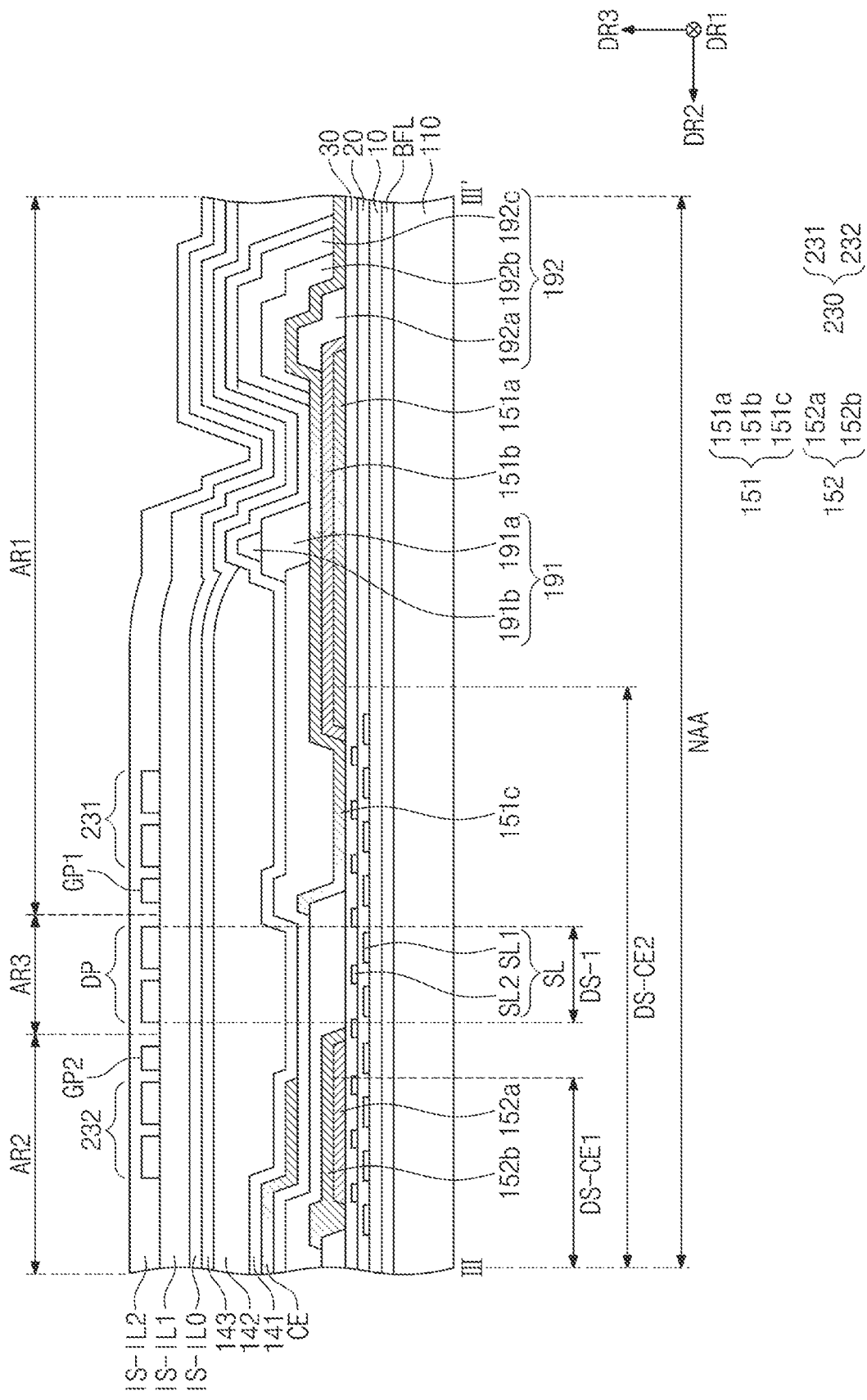
FIG. 10 is a cross-sectional view taken along the line III-III' in FIG. 8 according to an embodiment of the present disclosure.

FIG. 10 is a cross-sectional view taken along the line III-III' in FIG. 8 according to an embodiment of the present disclosure. In FIG. 10, the same reference symbols are used to refer to the same or substantially the same components described above with reference to FIG. 9, and thus, redundant description thereof may not be repeated.

Referring to FIGS. 9 and 10, the dummy pattern DP may be disposed at (e.g., in or on) the third region AR3. A width DS-1 of a region in which the dummy pattern DP is disposed may be about 45 µm to about 55 µm. For example, the width DS-1 may be about 50 µm.

The second electrode CE may be formed in a part of the peripheral region NAA and the active region AA (e.g., see FIG. 4). The area of a region in which the second electrode CE is disposed in the peripheral region NAA may be changed due to a process tolerance. For example, the second electrode CE may have an area between a first area DS-CE1 and a second area DS-CE2 due to the process tolerance. A width of the first area DS-CE1 in the second direction DR2 may be about 20 µm to about 30 µm. For example, the width of the first area DS-CE1 in the second direction DR2 may be about 24 µm. A width of the second area DS-CE2 in the second direction DR2 may be about 100 µm to about 130 µm. For example, the width of the second area DS-CE2 in the second direction DR2 may be about 115 µm. As an example, FIG. 10 illustrates that the region in which the second electrode CE is formed is provided to have a reduced or minimum area due to the process tolerance.

Unlike one or more embodiments of the present disclosure, in a case where the sensing lines 230 are disposed at (e.g., in or on) the third region AR3, when the second electrode CE has the first area DS-CE1 due to the process tolerance, the second electrode CE may not cover the third region AR3, so that the sensing lines 230 may be affected by a signal supplied to a plurality of signal lines SL disposed at (e.g., in or on) the display layer 100. This may cause noise in a touch coordinate sensed by the plurality of sensing electrodes 210 and 220. However, according to one or more embodiments of the present disclosure, when viewed on a plane (e.g., in a plan view), the first sensing line 231 may overlap with the first power supply pattern 151, and the second sensing line 232 may overlap with the second power supply pattern 152. The effect by a signal supplied to the plurality of signal lines SL disposed at (e.g., in or on) the display layer 100 may be blocked by the first power supply pattern 151 and the second power supply pattern 152. Thus, it may be possible to prevent or substantially prevent the noise cause by such an effect, which may occur in the touch coordinate sensed by the plurality of sensing electrodes 210 and 220. Accordingly, a display device 1000 (e.g., see FIG. 1) with improved reliability may be provided.

The first power supply pattern 151 and the second power supply pattern 152 may each include a plurality of layers. As an example, FIG. 10 illustrates that the first power supply pattern 151 includes three layers, and the second power supply pattern 152 includes two layers. However, the present disclosure is not limited thereto, and the number of layers of the first power supply pattern 151 and the number of layers of the second power supply pattern 152 may be variously modified as needed or desired. The first power supply pattern 151 and the second power supply pattern 152, each including a plurality of layers, may have improved electrical characteristics due to a reduced resistance.

For example, the first power supply pattern 151 may include a first layer 151a, a second layer 151b, and a third layer 151c. The first layer 151a may be disposed on a third insulating layer 30. The second layer 151b may be directly disposed on the first layer 151a. The third layer 151c may be disposed on the third insulating layer 30, the second layer 151b, and a first protrusion portion 192a of a second protrusion 192.

The second power supply pattern 152 may include a first layer 152a and a second layer 152b. The first layer 152a may be disposed on the third insulating layer 30. The second layer 152b may be directly disposed on the first layer 152a.

The display layer 100 (e.g., see FIG. 2) may include the second protrusion 192, and may further include a first protrusion 191. The protrusions 191 and 192 may be disposed at (e.g., in or on) the peripheral region NAA. When an organic monomer is printed to form an organic encapsulation layer 142, the protrusions 191 and 192 may serve to prevent or substantially prevent the organic monomer from overflowing. The protrusions 191 and 192 may each be provided in a plurality.

The first protrusion 191 may include a plurality of layers in a stacked structure. For example, the first protrusion 191 may include a first protrusion portion 191a, and a second protrusion portion 191b stacked on the first protrusion portion 191a. The first protrusion portion 191a and a sixth insulating layer 60 (e.g., see FIG. 5) may include the same material as each other, and the first protrusion portion 191a and the sixth insulating layer 60 may be formed through the same or substantially the same process as each other. The second protrusion portion 191b and a pixel-defining film PDL (e.g., see FIG. 5) may include the same material as each other, and the second protrusion portion 191b and the pixel-defining film PDL may be formed through the same or substantially the same process as each other.

The second protrusion 192 may include a plurality of layers in a stacked structure. For example, the second protrusion 192 may include the first protrusion portion 192a, a second protrusion portion 192b stacked on the first protrusion portion 192a, and a third protrusion portion 192c stacked on the second protrusion portion 192b. The first protrusion portion 192a and a fifth insulating layer 50 (e.g., see FIG. 5) may include the same material as each other, and the first protrusion portion 192a and the fifth insulating layer 50 may be formed through the same or substantially the same process as each other. The second protrusion portion 192b and the sixth insulating layer 60 (e.g., see FIG. 5) may include the same material as each other, and the second protrusion portion 192b and the sixth insulating layer 60 may be formed through the same or substantially the same process as each other. The third protrusion portion 192c and the pixel-defining film PDL (e.g., see FIG. 5) may include the same material as each other, and the third protrusion portion 192c and the pixel-defining film PDL may be formed through the same or substantially the same process as each other.

In addition, unlike one or more embodiments of the present disclosure, in a case wherein the dummy pattern DP is not disposed at (e.g., in or on) the third region AR3, the third region AR3 may be visible from the outside due to a difference between the stacked structure of the first region AR1 and the second region AR2, and the stacked structure of the third region AR. However, according to one or more embodiments of the present disclosure, the dummy pattern DP may be disposed at (e.g., in or on) the third region AR3. The dummy pattern DP and the plurality of sensing lines 231 and 232 may be formed through the same or substantially the same process as each other. The reflectance of external light at the third region AR3 by the dummy pattern DP may have a similar value to the reflectance of the external light at each of the first region AR1 and the second region AR2. Accordingly, the third region AR3 may be prevented or substantially prevented from being viewed from the outside.

Figure 11A:
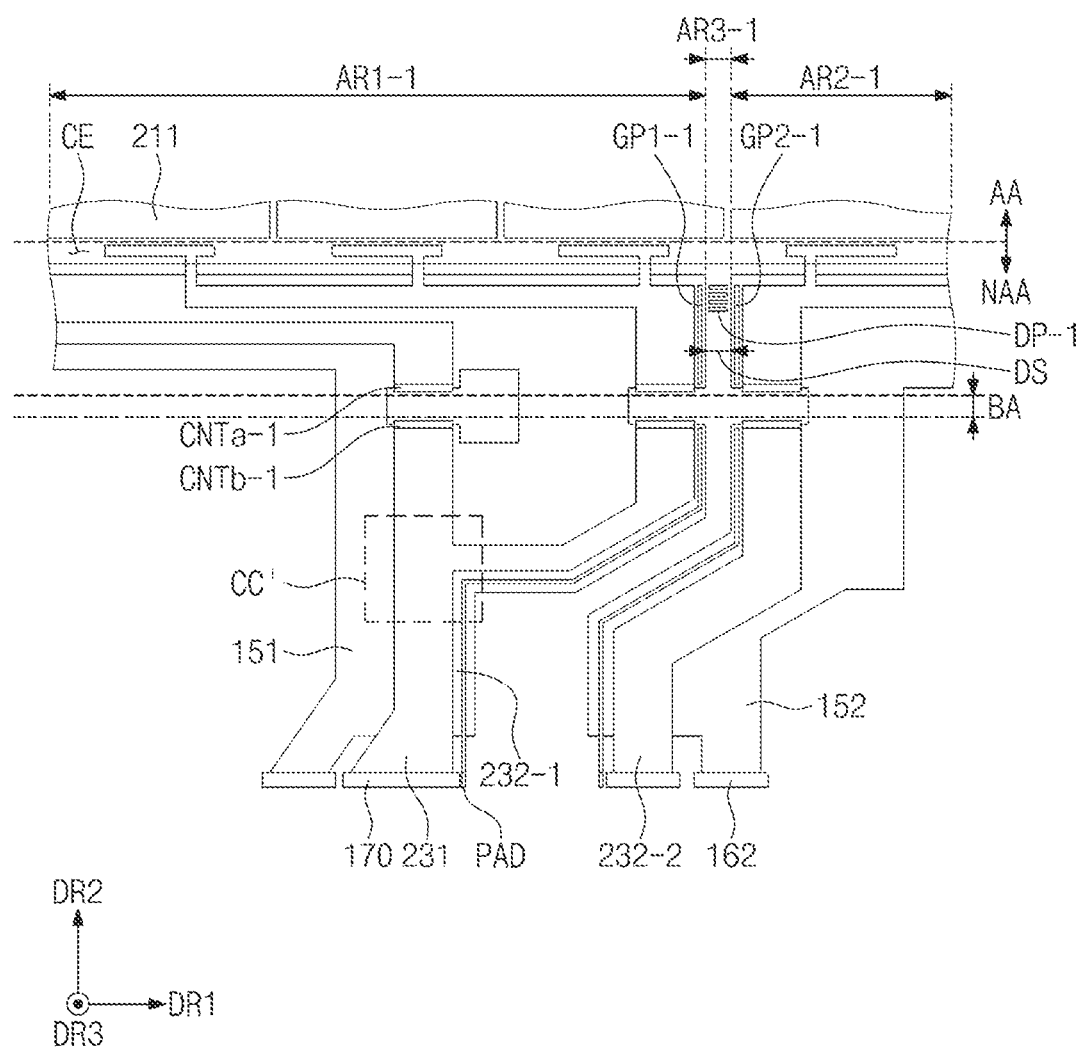
FIG. 11A is a plan view illustrating a region of a display device corresponding to the region BB' in FIG. 6A according to an embodiment of the present disclosure.
Figure 11B:
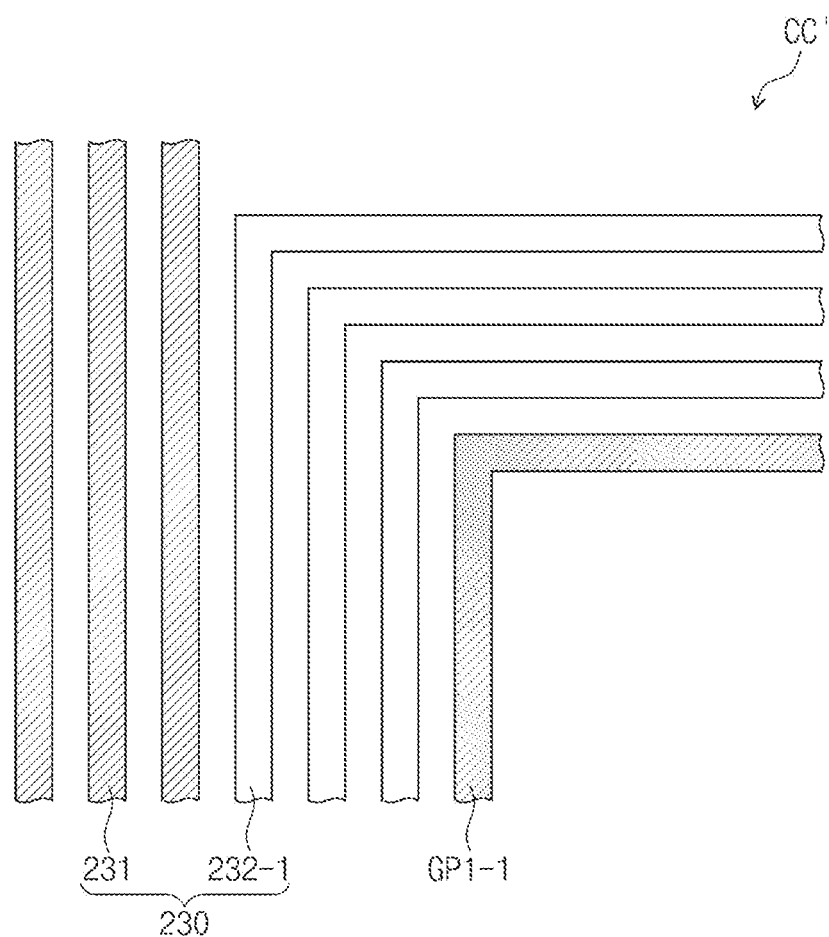
FIG. 11B is an enlarged plan view illustrating the region CC' in FIG. 11A according to an embodiment of the present disclosure.

FIG. 11A is a plan view illustrating a region of a display device corresponding to the region BB' in FIG. 6A according to an embodiment of the present disclosure, and FIG. 11B is an enlarged plan view illustrating the region CC' in FIG. 11A according to an embodiment of the present disclosure. In FIG. 11A, the same reference symbols are used to denote the same or substantially the same components as those described above with reference to FIG. 8, and thus, redundant description thereof may not be repeated.

Referring to FIGS. 11A and 11B, a peripheral region 100N of a display layer 100 may include a first region AR1-1, a second region AR2-1, and a third region AR3-1.

The first region AR1-1 may be spaced apart from the second region AR2-1 in the first direction DR1. The third region AR3-1 may be disposed between the first region AR1-1 and the second region AR2-1.

A first power supply pattern 151 may be disposed at (e.g., in or on) the first region AR1-1. A second power supply pattern 152 may be disposed at (e.g., in or on) the second region AR2-1.

A plurality of first sensing lines 231 may be disposed at (e.g., in or on) the first region AR1-1. When viewed on a plane (e.g., in a plan view), the plurality of first sensing lines 231 may overlap with the first power supply pattern 151. The plurality of first sensing lines 231 may each be electrically connected through a first contact CNTa-1 and a second contact CNTb-1 in a region adjacent to the bending region BA.

A plurality of second sensing lines 232 (e.g., see FIG. 6) may include a plurality of first lines 232-1 and a plurality of second lines 232-2.

The plurality of second lines 232-2 may be spaced apart from the plurality of first lines 232-1 in the first direction DR1 with a dummy pattern DP-1 therebetween.

The plurality of first lines 232-1 may be disposed at (e.g., in or on) the first region AR1-1. When viewed on a plane (e.g., in a plan view), the plurality of first lines 232-1 may overlap with the first power supply pattern 151. The plurality of first lines 232-1 may each be electrically connected through a plurality of contact holes in a region adjacent to the bending region BA. The plurality of first lines 232-1 may be disposed adjacent to the plurality of first sensing lines 231. A plurality of sensing electrodes 220 may include a plurality of sensing patterns 211. Sensing patterns from among the plurality of sensing patterns 211 that face the first power supply pattern 151 may be electrically connected to the plurality of first lines 232-1.

The plurality of second lines 232-2 may be disposed at (e.g., in or on) the second region AR2-1. When viewed on a plane (e.g., in a plan view), the plurality of second lines 232-2 may overlap with the second power supply pattern 152. The plurality of second lines 232-2 may each be electrically connected through a plurality of contact holes in a region adjacent to the bending region BA. Sensing patterns from among the plurality of sensing patterns 211 that face the second power supply pattern 152 may be electrically connected to the plurality of second lines 232-2.

When viewed on a plane (e.g., in a plan view), the plurality of first sensing lines 231, the plurality of first lines 232-1, and the plurality of second lines 232-2 may not overlap with the third region AR3-1.

The dummy pattern DP-1 may be disposed at (e.g., in or on) the third region AR3-1. When viewed on a plane (e.g., in a plan view), the dummy pattern DP-1 may be disposed between the first power supply pattern 151 and the second power supply pattern 152.

A first guard pattern GP1-1 and a second guard pattern GP2-1 may be spaced apart from each other with the dummy pattern DP-1 therebetween.

The first guard pattern GP1-1 may be disposed at (e.g., in or on) the first region AR1-1. The first guard pattern GP1-1 may be disposed between the plurality of first lines 232-1 and the dummy pattern DP-1. The first guard pattern GP1-1 may extend along a first line, which is the outermost line from among the plurality of first lines 232-1. The first guard pattern GP1-1 may be electrically connected through a plurality of contact holes in a region adjacent to the bending region BA.

The second guard pattern GP2-1 may be disposed at (e.g., in or on) the second region AR2-1. The second guard pattern GP2-1 may be disposed between the plurality of second lines 232-2 and the dummy pattern DP-1. The second guard pattern GP2-1 may extend along a second line, which is the outermost line from among the plurality of second lines 232-2. The second guard pattern GP2-1 may be electrically connected through a plurality of contact holes in a region adjacent to the bending region BA.

The first guard pattern GP1-1 may protect the plurality of first lines 232-1. The second guard pattern GP2-1 may protect the plurality of second lines 232-2. For example, the first guard pattern GP1-1 may protect the first line that is the outermost line from among the plurality of first lines 232-1, and the second guard pattern GP2-1 may protect the second line that is the outermost line from among the plurality of second lines 232-2.

A pad PAD may be electrically connected to each of the first guard pattern GP1-1 and the second guard pattern GP2-1. A constant voltage may be supplied to each of the first guard pattern GP1-1 and the second guard pattern GP2-1 from the pad PAD.

A signal of each of the plurality of first lines 232-1 may be affected by signals supplied to adjacent first lines. A signal of the outermost first line disposed in a region adjacent to the third region AR3-1 may be affected by a signal supplied to one adjacent first line. In addition, a signal of the outermost first line may be affected by a constant voltage of the first guard pattern GP1-1. A difference between a degree that the outermost first line is affected and a degree that another first line is affected may be reduced. A signal of each of the plurality of second lines 232-2 may be affected by signals supplied to adjacent second lines. A signal of the outermost second line disposed in a region adjacent to the third region AR3-1 may be affected by a signal supplied to one adjacent second line. In addition, a signal of the outermost second line may be affected by a constant voltage of the second guard pattern GP2-1. Accordingly, a difference between a degree that the outermost second line is affected and a degree that another second line is affected may be reduced.

According to one or more embodiments of the present disclosure, the first guard pattern GP1-1 and the second guard pattern GP2-1 may reduce the difference between the degree that the outermost sensing line is affected by adjacent sensing lines and the degree that another sensing line is affected. Accordingly, a display device 1000 (e.g., see FIG. 1) with improved reliability with respect to a sensor layer 200 may be provided.

Unlike one or more embodiments of the present disclosure, in a case where the plurality of sensing lines 230 are disposed at (e.g., in or on) the third region AR3, the sensing lines 232-1 and 232-2 may be affected by a signal supplied to the plurality of signal lines GL, DL, PL, and EL (e.g., see FIG. 4) disposed at (e.g., in or on) the display panel 100 when the second electrode CE does not cover the third region AR3-1. This may cause noise in a touch coordinate sensed by the plurality of sensing electrodes 210 and 220. However, according to one or more embodiments of the present disclosure, when viewed on a plane (e.g., in a plan view), the plurality of first lines 232-1 may overlap with the first power supply pattern 151, and the plurality of second lines 232-2 may overlap with the second power supply pattern 152. Thus, the effect by the signal supplied to the plurality of signal lines GL, DL, PL, and EL disposed at (e.g., in or on) the display layer 100 (e.g., see FIG. 4) may be blocked by the first power supply pattern 151 and the second power supply pattern 152. Therefore, it may be possible to prevent or substantially prevent the noise caused by such an effect, which may occur in the touch coordinate sensed by the plurality of sensing electrodes 210 and 220. Accordingly, a display device 1000 (e.g., see FIG. 1) with improved reliability may be provided.

The dummy pattern DP-1, the plurality of first lines 232-1, and the plurality of second lines 232-2 may be disposed at (e.g., in or on) the same layer as each other. The dummy pattern DP-1, the plurality of first lines 232-1, and the plurality of second lines 232-2 may include the same material as each other. The dummy pattern DP-1 may be floated. The dummy pattern DP-1, the plurality of first lines 232-1, and the plurality of second lines 232-2 may be formed through the same or substantially the same process as each other.

Unlike one or more embodiments of the present disclosure, in a case where the dummy pattern DP-1 is not disposed at (e.g., in or on) the third region AR3-1, the third region AR3-1 may be visible from the outside due to a difference between the stacked structure of the first region AR1-1 and the second region AR2-1, and the stacked structure of the third region AR3-1. However, according to one or more embodiments of the present disclosure, the dummy pattern DP-1, the plurality of first lines 232-1, and the plurality of second lines 232-2 may be disposed at (e.g., in or on) the same layer as each other. The reflectance of external light at the third region AR3-1 by the dummy pattern DP-1 may have a similar value to the reflectance of the external light at each of the first region AR1-1 and the second region AR2-1. Accordingly, the third region AR3-1 may be prevented or substantially prevented from being viewed from the outside.

According to one or more embodiments of the present disclosure, when viewed on a plane (e.g., in a plan view), a first sensing line may overlap with a first power supply pattern, and a second sensing line may overlap with a second power supply pattern. An effect by a signal supplied to a plurality of signal lines in a display layer may be blocked by the first power supply pattern and the second power supply pattern. Thus, it may be possible to prevent or substantially prevent noise cause by such an effect, which may occur in a touch coordinate sensed by a plurality of sensing electrodes. Accordingly, a display device with improved reliability may be provided.

In addition, according to one or more embodiments of the present disclosure, a dummy pattern and a plurality of sensing lines may be disposed at (e.g., in or on) the same layer as each other. Thus, the reflectance of external light at a third region by the dummy pattern may have a similar value to the reflectance of external light at each of a first region and a second region. Accordingly, the third region may be prevented or substantially prevented from being viewed from the outside.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:
a display layer defining a first region and a second region adjacent to the first region; and
a sensor layer on the display layer,
wherein the display layer comprises:
a plurality of pixels at the first region; and
a power supply pattern at the second region, and electrically connected to the plurality of pixels, the power supply pattern comprising a first power supply pattern and a second power supply pattern spaced from the first power supply pattern,
wherein the sensor layer comprises a dummy pattern located between the first power supply pattern and the second power supply pattern in a plan view, and
wherein the dummy pattern is disposed in the second region and is adjacent to the first power supply pattern and the second power supply pattern, and
wherein the dummy pattern is electrically floated.

2. The display device of claim 1, wherein the first power supply pattern is configured to receive a first power voltage, and the second power supply pattern is configured to receive a second power voltage having a different level from that of the first power voltage.

3. The display device of claim 1, wherein the dummy pattern does not overlap the first power supply pattern and the second power supply pattern in the plan view.

4. The display device of claim 1, wherein the sensor layer further comprises:
a plurality of sensing electrodes at the first region; and
a plurality of sensing lines electrically connected to the plurality of sensing electrodes, the plurality of sensing lines comprising a first sensing line and a second sensing line,
wherein, in the plan view, the first sensing line is on the first power supply pattern, and
wherein, in the plan view, the second sensing line is on at least one of the first power supply pattern or the second power supply pattern.

5. The display device of claim 4, wherein the plurality of sensing lines do not overlap the dummy pattern in the plan view.

6. The display device of claim 4, wherein the dummy pattern and the plurality of sensing lines are located at a same layer as each other.

7. The display device of claim 4, wherein the dummy pattern comprises a same material as that of the plurality of sensing lines.

8. The display device of claim 4, wherein the second sensing line comprises a first line, and a second line spaced from the first line with the dummy pattern therebetween, and
wherein the first line overlaps with the first power supply pattern and the second line overlaps with the second power supply pattern in the plan view.

9. The display device of claim 8, wherein sensing electrodes that face the first power supply pattern from among the plurality of sensing electrodes are electrically connected to the first line, and sensing electrodes that face the second power supply pattern from among the plurality of sensing electrodes are electrically connected to the second line.

10. A display device comprising:
a display layer defining a first region and a second region adjacent to the first region; and
a sensor layer on the display layer,
wherein the display layer comprises:
a plurality of pixels at the first region; and
a power supply pattern at the second region, and electrically connected to the plurality of pixels, the power supply pattern comprising a first power supply pattern and a second power supply pattern spaced from the first power supply pattern,
wherein the sensor layer comprises a dummy pattern located between the first power supply pattern and the second power supply pattern in a plan view, and
wherein the dummy pattern is disposed in the second region and is adjacent to the first power supply pattern and the second power supply pattern,
wherein the sensor layer further comprises:
a plurality of sensing electrodes at the first region; and
a plurality of sensing lines electrically connected to the plurality of sensing electrodes, the plurality of sensing lines comprising a first sensing line and a second sensing line,
wherein, in the plan view, the first sensing line is on the first power supply pattern, and
wherein, in the plan view, the second sensing line is on at least one of the first power supply pattern or the second power supply pattern, and
wherein the sensor layer further comprises a first guard pattern and a second guard pattern spaced from the first guard pattern with the dummy pattern therebetween.

11. The display device of claim 10, wherein the first guard pattern is on the first power supply pattern and the second guard pattern is on the second power supply pattern.

12. The display device of claim 10, wherein the first and second guard patterns and the plurality of sensing lines are located at a same layer as each other.

13. The display device of claim 10, wherein the first guard pattern is located between the first sensing line and the dummy pattern.

14. The display device of claim 10, wherein the first guard pattern extends along the first sensing line.

15. The display device of claim 10, wherein the second guard pattern is located between the second sensing line and the dummy pattern.

16. The display device of claim 10, wherein the second guard pattern extends along the second sensing line.

17. The display device of claim 10, wherein each of the first guard pattern and the second guard pattern is configured to receive a constant voltage.

18. A display device comprising:
a display layer defining a first region and a second region; and
a sensor layer on the display layer,
wherein the display layer comprises:
a plurality of pixels at the first region; and
a power supply pattern at the second region, and electrically connected to the plurality of pixels, the power supply pattern comprising a first power supply pattern and a second power supply pattern spaced from the first power supply pattern,
wherein the sensor layer comprises:
a plurality of sensing electrodes at the first region; and
a plurality of sensing lines electrically connected to the plurality of sensing electrodes, the plurality of sensing lines comprising a plurality of first sensing lines and a plurality of second sensing lines,
wherein, in a plan view, the plurality of first sensing lines overlaps with the first power supply pattern, and is spaced from the second power supply pattern, and
wherein, in the plan view, the plurality of second sensing lines overlaps with the second power supply pattern, and is spaced from the first power supply pattern.

19. The display device of claim 18, wherein the first power supply pattern is configured to receive a first power voltage, and the second power supply pattern is configured to receive a second power voltage having a different level from that of the first power voltage.

20. The display device of claim 18, wherein the plurality of pixels comprises a first electrode, a light-emitting layer, and a second electrode, and
wherein, in the plan view, the second electrode does not overlap with the plurality of first sensing lines and the plurality of second sensing lines.

* * * * *